United States Patent [19]

Sorber et al.

[11] 3,824,347

[45] July 16, 1974

[54] VOICE AND DATA MULTIPLEXING SYSTEM WITH IMPROVED SIGNALLING

[75] Inventors: Thomas A. Sorber, Huntingdon Valley; Ralph C. Unks, Flourtown, both of Pa.

[73] Assignee: I. I. Communications Corporation, Lionville, Pa.

[22] Filed: Feb. 1, 1973

[21] Appl. No.: 328,565

[52] U.S. Cl. ...... 179/15 BM, 179/2 DP, 179/84 VF
[51] Int. Cl. ...... H04j 3/12
[58] Field of Search ........ 179/2 DP, 15 BM, 15 BY, 179/84 VF

[56] References Cited

UNITED STATES PATENTS

| | | | |
|---|---|---|---|
| 2,974,281 | 3/1961 | Feldman | 179/2 DP |
| 3,226,482 | 12/1965 | Wright | 179/2 DP |
| 3,444,324 | 5/1969 | Dougan | 179/2 DP |
| 3,720,933 | 3/1973 | Schulein | 179/15 BM |

*Primary Examiner*—Ralph D. Blakeslee
*Attorney, Agent, or Firm*—Caesar, Revise, Bernstein & Cohen

[57] ABSTRACT

A multiplexing system is provided for use in combination with a common grade telephone voice channel. A first means is provided which during a first mode of operation limits a physical speech band into a first reduced frequency band of a predetermined bandwidth. The bandwidth is less than one-half of the bandwidth of the voice channel and the first band is situated at the low end of the channel. A second means is operative during the first mode of operation for limiting the physical speech band into a second reduced frequency band of a predetermined bandwidth. The second means positions the second band above the first band in the channel. The second band is also less than one-half of the bandwidth of the voice channel. The second means is operative during a second mode of operation for limiting the physical speech band into a third reduced frequency band which is slightly narrower than the bandwidth of the voice channel. A switching means is provided for disabling the first means during the second mode of operation. Means are provided for generating a first signal indicating the use of the first band, and first dialing signals associated with the use of said band and for providing a second signal indicating the use of the second or the third band and second dialing signals associated with the use of said band. Means are also provided for combining the first and second bands, the first and second signals during the first mode of operation and for combining the third band and the second signal during the second mode of operation. The system also comprises means for discriminating between said first and second signals and other signals which may appear in the system, dialing signal discriminating means for discriminating between true dialing signals and other signals which may appear in the system and normalizing means for normalizing the on/off ratio of the dialing signals.

10 Claims, 16 Drawing Figures

VOICE AND DATA MULTIPLEXING SYSTEM WITH IMPROVED SIGNALLING

This invention relates generally to multiplexing systems and more particularly to a system for compressing the voice bands so that a single common grade telephone voice channel can be utilized to transmit more than a single conversation.

The common grade telephone voice channel of approximately 300 Hertz (Hz) to 3000 Hz was evolved at least as early as the 1920's. The common grade telephone voice channel was developed on an empirical basis by using large numbers of listening juries and deriving an approximate bandwidth, wire size and telephone amplification based on the economies of the 1920's.

The use of the telephone has of course expanded at a considerable pace since the 1920's and at present there is a severe shortage of telephone lines in many congested areas. Moreover, the cost for adding or changing a telephone circuit is very expensive since in many areas the telephone cables are underground and the adding of additional underground cables can be a major project.

The shortage of telephone lines is particularly severe during the peak hours of the day. For example, international telephone communication between the United States and Europe has a severely restricted peak time due to the fact that the time differences causes a short period of the day in which both the United States and Europe have working hours.

In co-pending U.S. Pat. application Ser. No. 314,648 filed on Dec. 13, 1972, there is disclosed and claimed a novel voice and data multiplexing system, which, during one mode of operation, enables two separate conversations to be transmitted over a single common grade telephone voice channel without audible interference therebetween, thus doubling the conversation carrying capability of the voice channel.

As disclosed therein, the voice and data multiplexing system includes means for determining and indicating whether or not valid "on" or "off" hook conditions exist, for producing dialing signals indicative of dialing information provided thereto, which dialing information is utilized to ring an associated telephone, for determining whether such dialing signals are valid and for normalizing the dialing signals into signals having the proper on/off ratio as required by the telephone company. Such means, as noted therein, forms no part of the invention claimed therein separate and apart from the system claimed, but rather forms the subject matter of the invention claimed herein.

Accordingly, it is a general object of this invention to provide in a system for use with a common grade telephone voice channel, improved means for providing control signals.

It is a further object of this invention to provide in a system for enabling two voice signals and two control signals to be transmitted within a common grade voice channel without interference therebetween, improved means for detecting the presence of said control signals.

It is still a further object of this invention to provide in a system for enabling two voice signals and associated on hook, off hook and dialing signals to be transmitted within a common grade telephone voice channel, improved means: (1) for determining if an on hook signal is valid and for precluding dialing signals from signalling any telephone in the system if a valid on hook signal is in existence; (2) for determining if an off hook signal is valid and for enabling dialing pulses to signal an associated telephone in the system if a valid off hook signal is in existence and (3) for normalizing said dialing signals.

These and other objects of the invention are achieved by providing improved signal receiving means for a system for use with a common grade telephone voice channel comprising first means operative for transmitting a first voice signal, second means for transmitting a second voice signal, third means for transmitting a first on hook signal when said first means is not operating and for transmitting a first off hook signal and first dialing signals when said first means is operating, fourth means for transmitting a second on hook signal when said second means is not operating and for transmitting a second off hook signal and second dialing signals when said second means is operating. The improved signal receiving means comprises first receiving means comprising discriminating means for discriminating between said first off hook signal and other signals which may exist within said channel, second discriminating means for discriminating between valid first dialing signals and other signals which may exist within the channel and first gate means operative in response to the detection of a valid off hook signal by said first discriminating means for enabling the first dialing signals to signal a particular telephone in accordance with the content of said dialing signals. Second receiving means are provided and comprise third discriminating means for discriminating between said second off hook signals and other signals which may exist within said channel, fourth discriminating means for discriminating between valid second dialing signals and other signals which may exist within said channel and second gate means operative in response to the detection of a valid off hook signal by said third discriminating means for enabling said second dialing signals to signal a particular telephone in accordance with the content of said dialing signals.

Other objects and many of the attendant advantages of this invention will be readily appreciated as the same becomes better understood by reference to the following detailed description when considered in connection with the accompanying drawings wherein.

Figure 1:
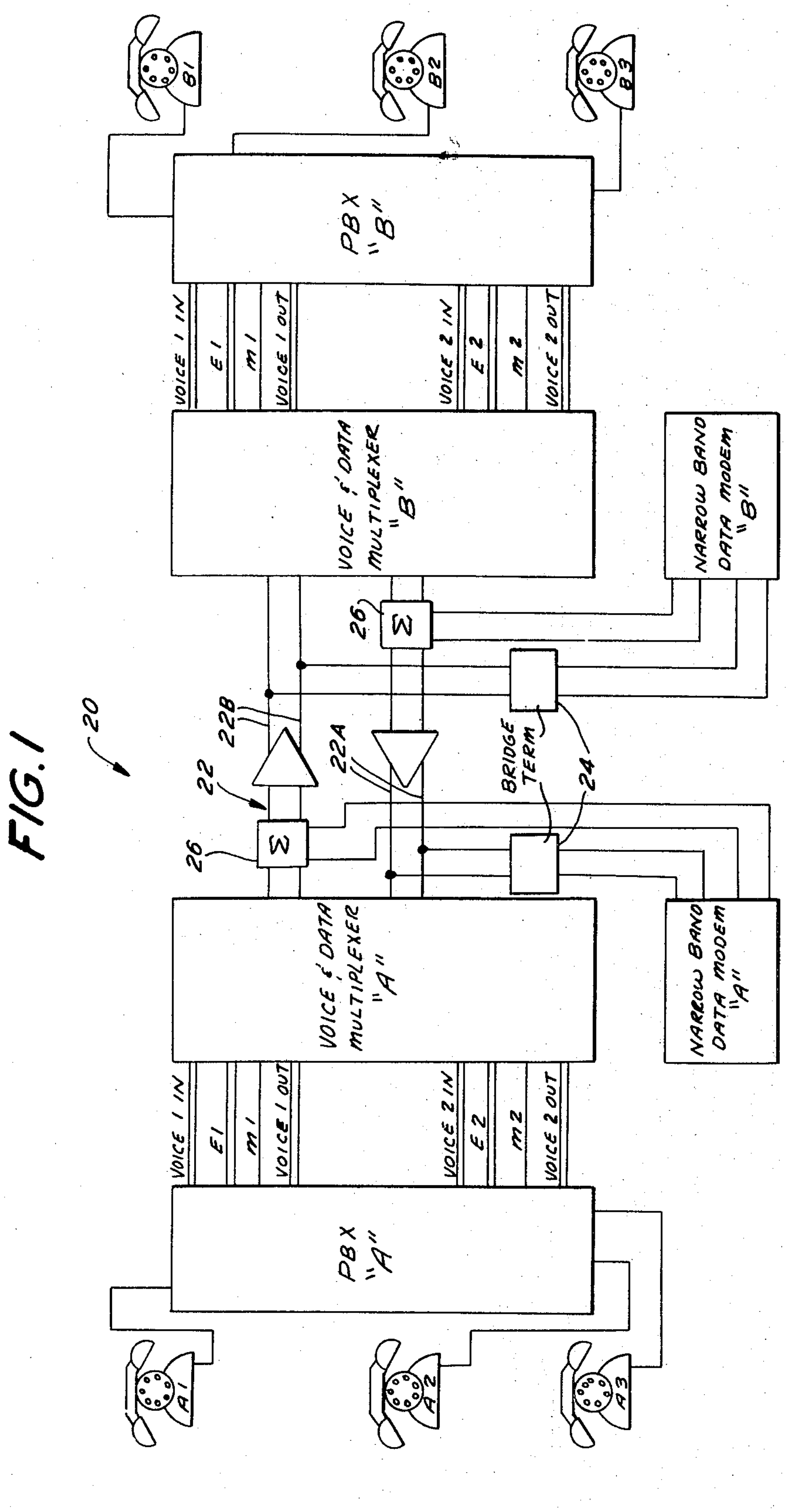
FIG. 1 is a schematic diagram of a telephone system utilizing the voice and data multiplexing system of this invention.
Figure 3A:
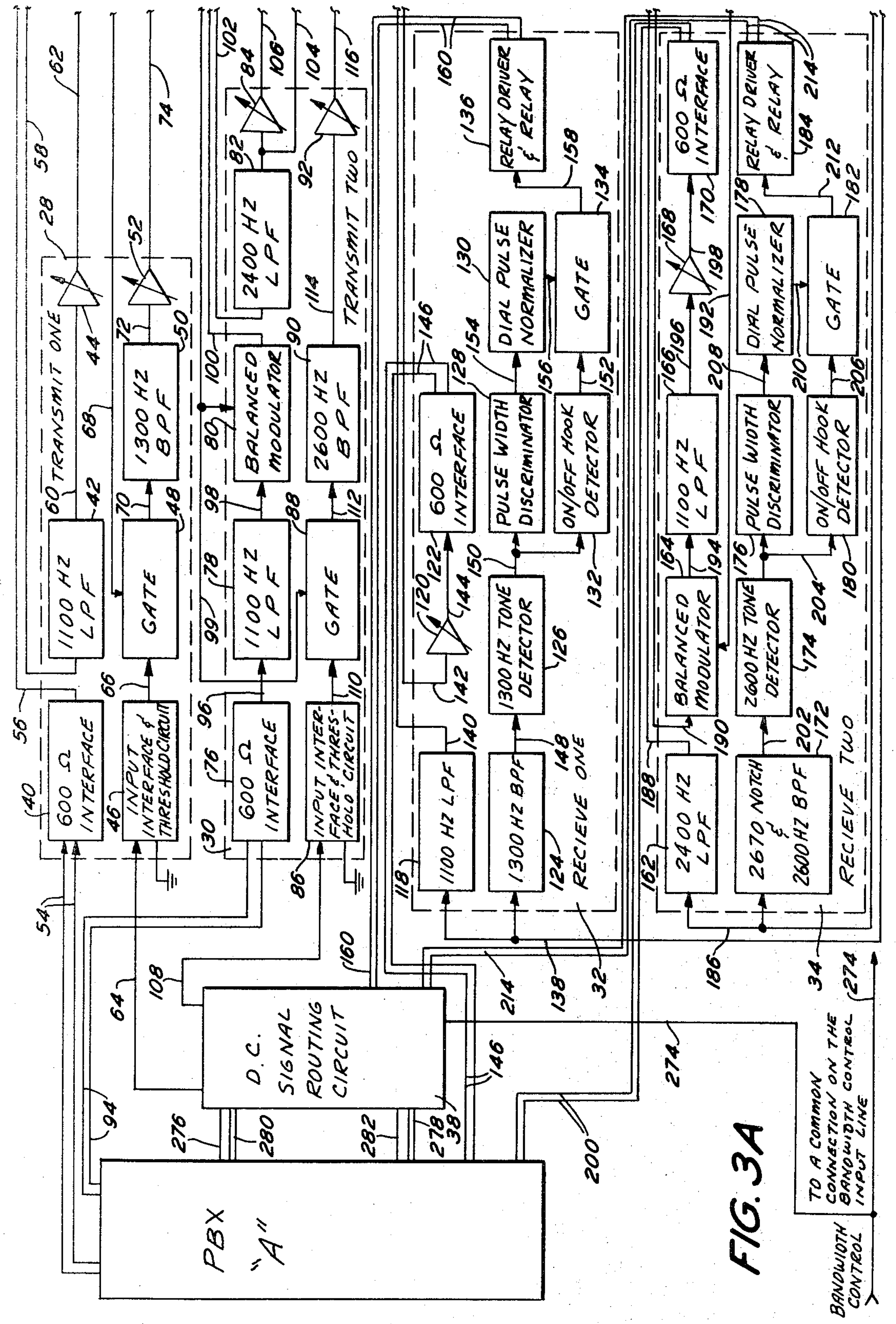
Figure 3B:
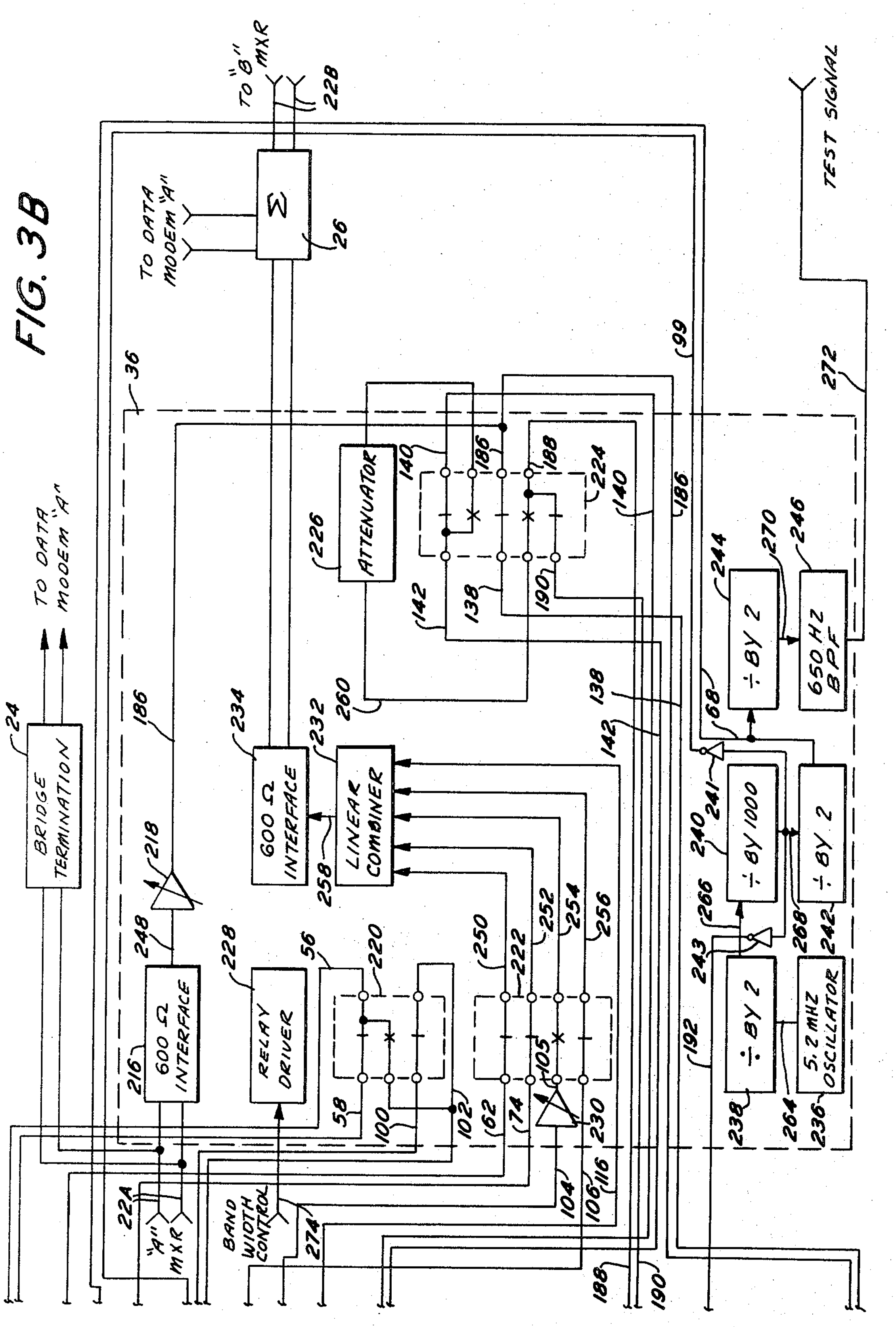
Figure 4A:
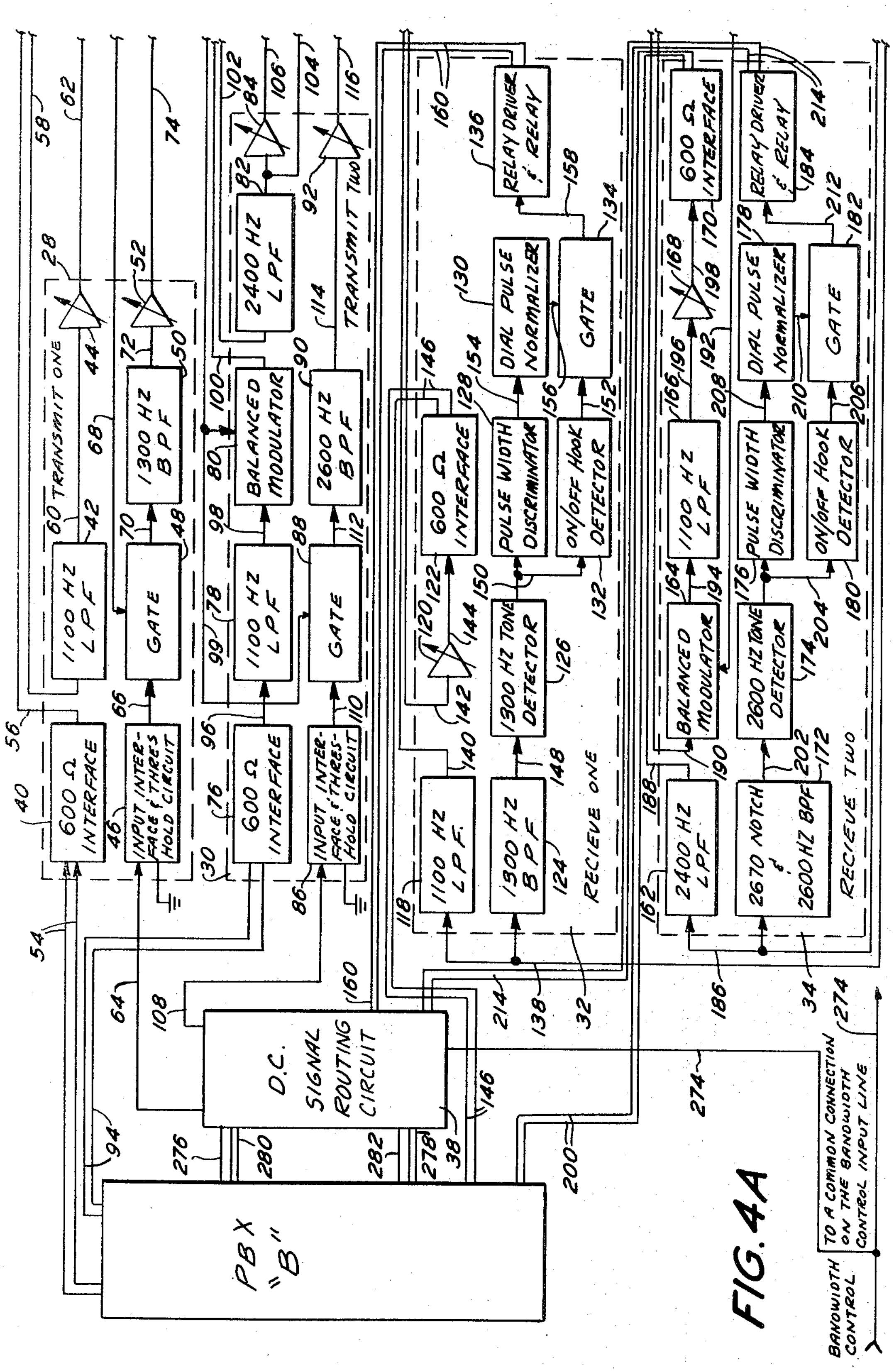
Figure 4B:
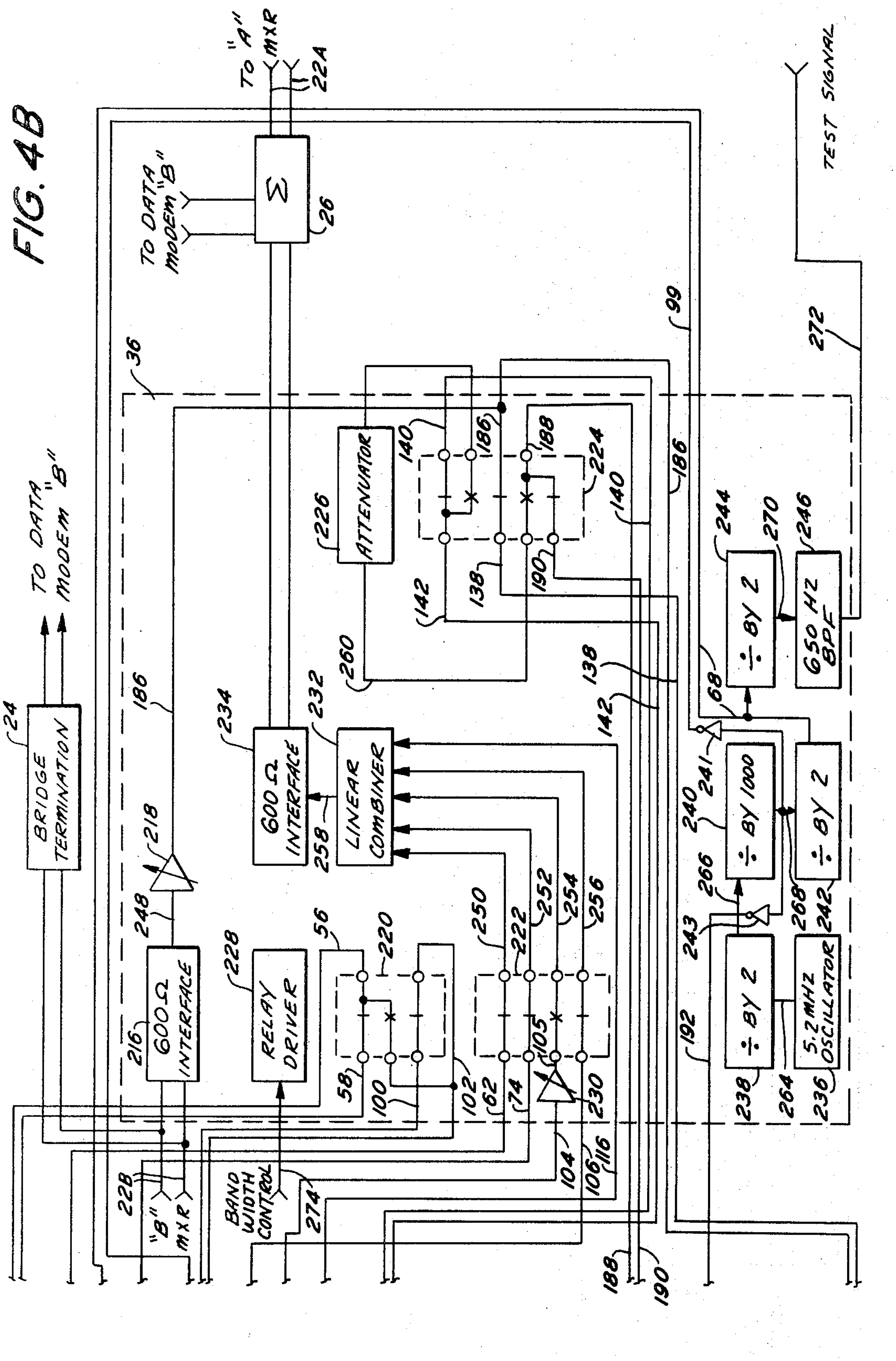
Figure 5:
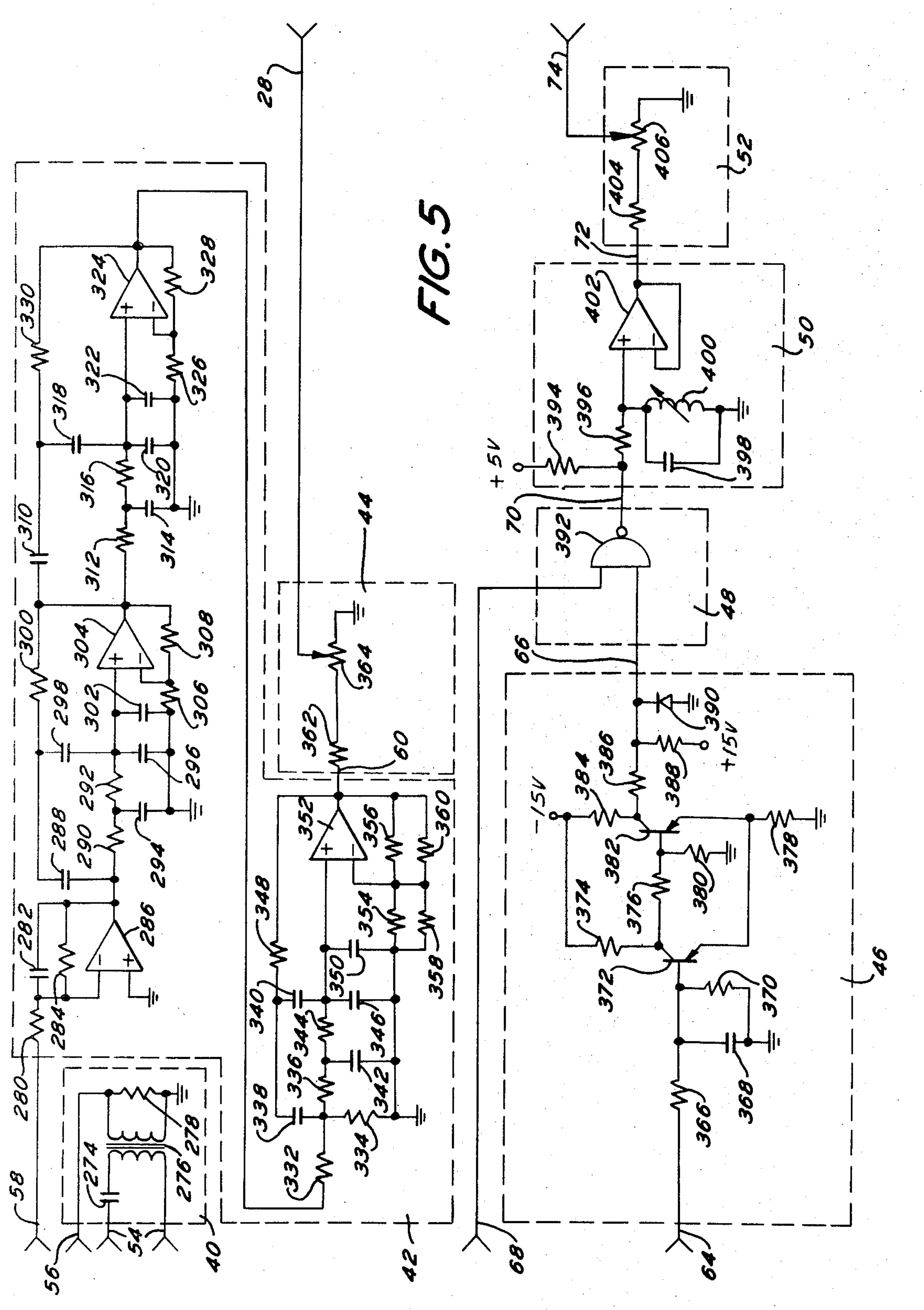
Figure 6A:
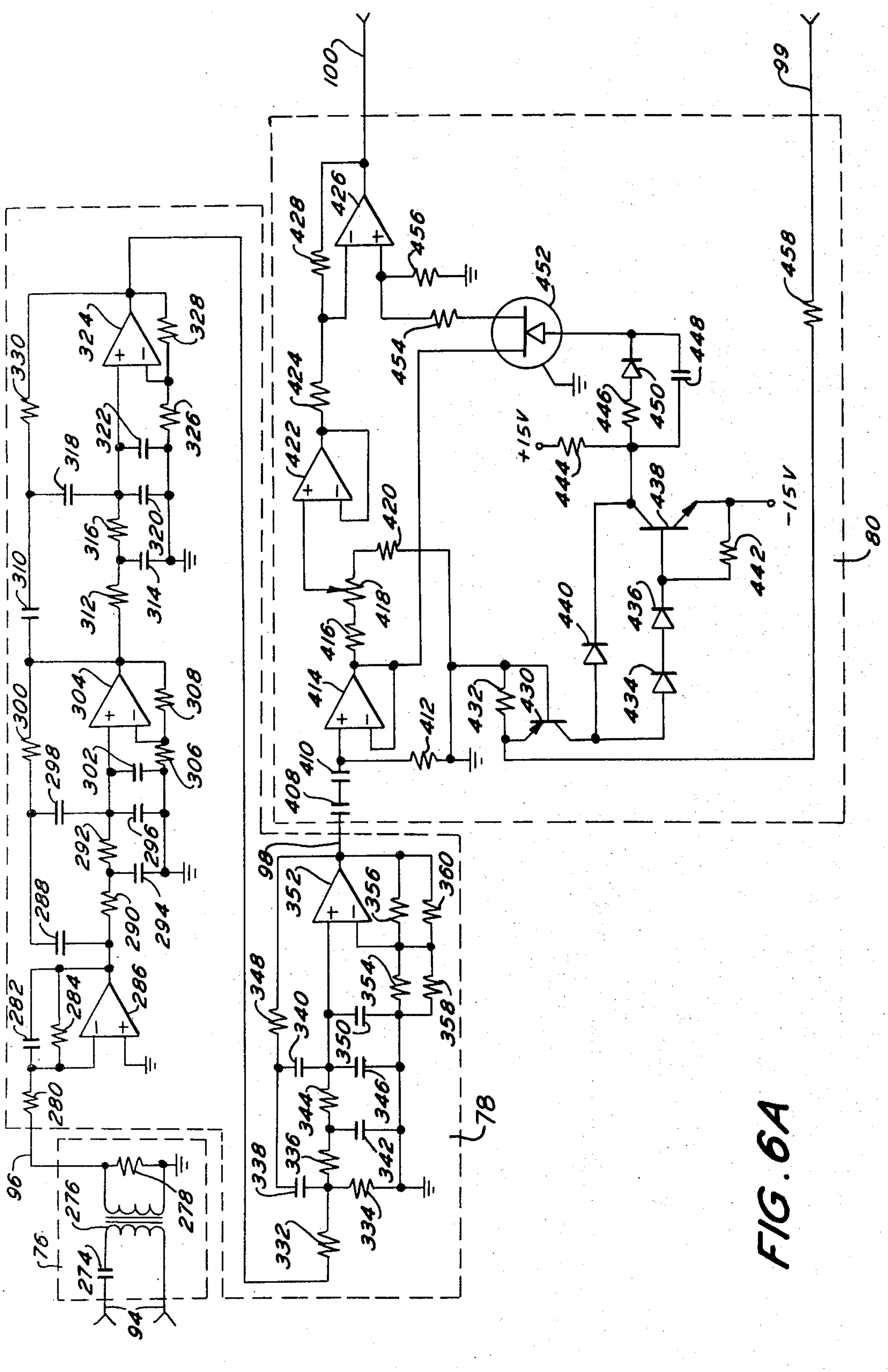
Figure 6B:
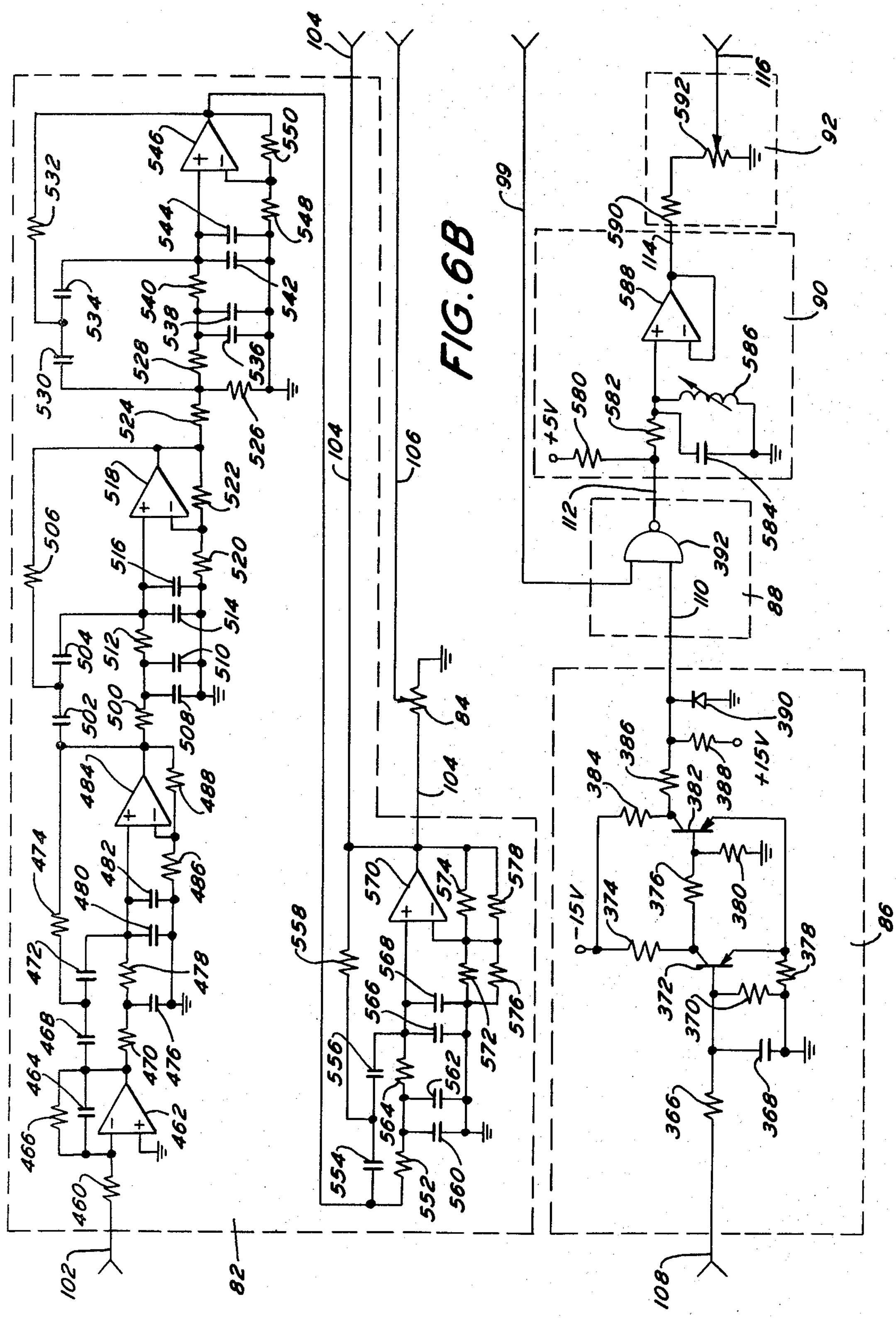
Figure 7A:
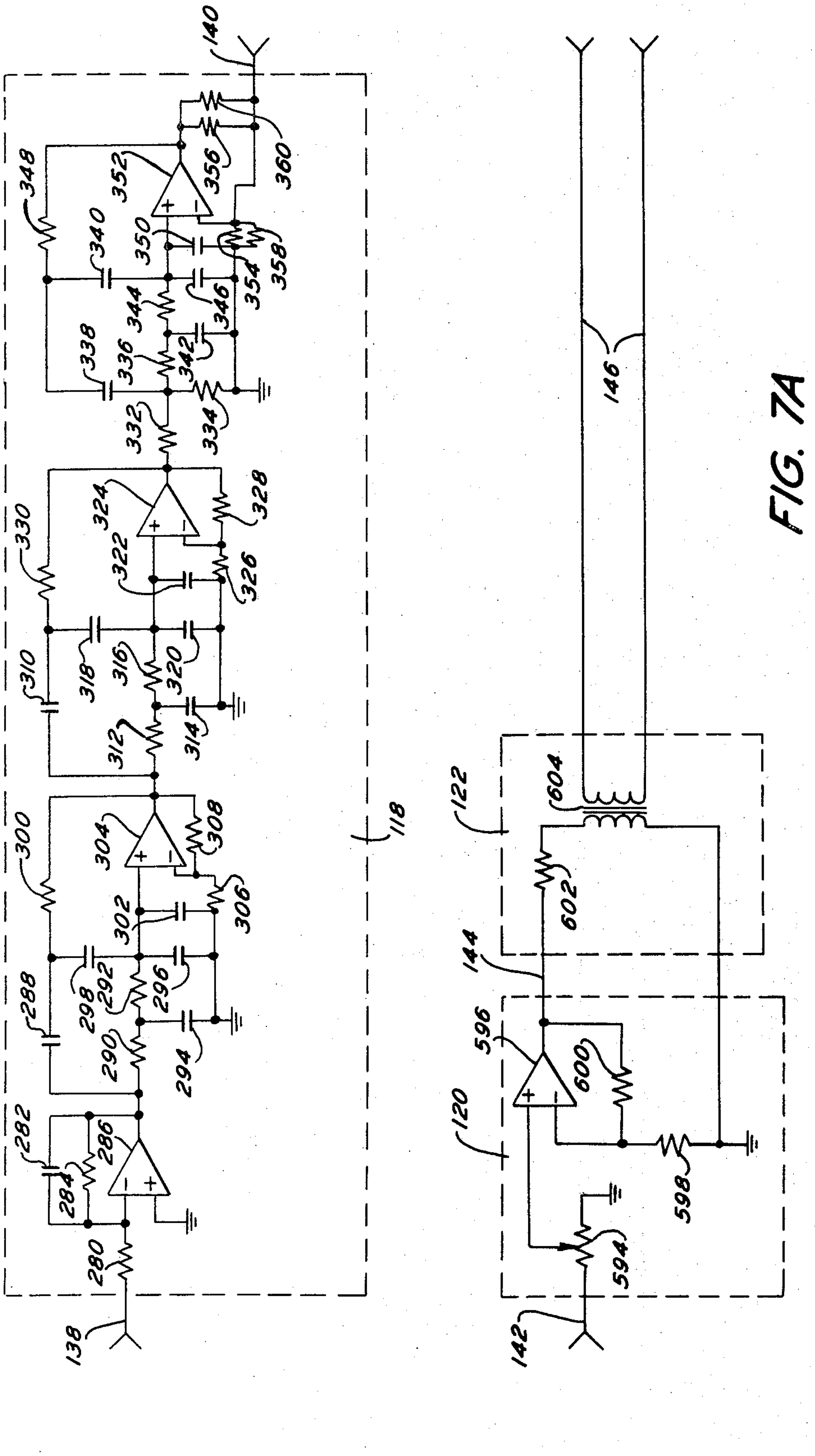
Figure 7B:
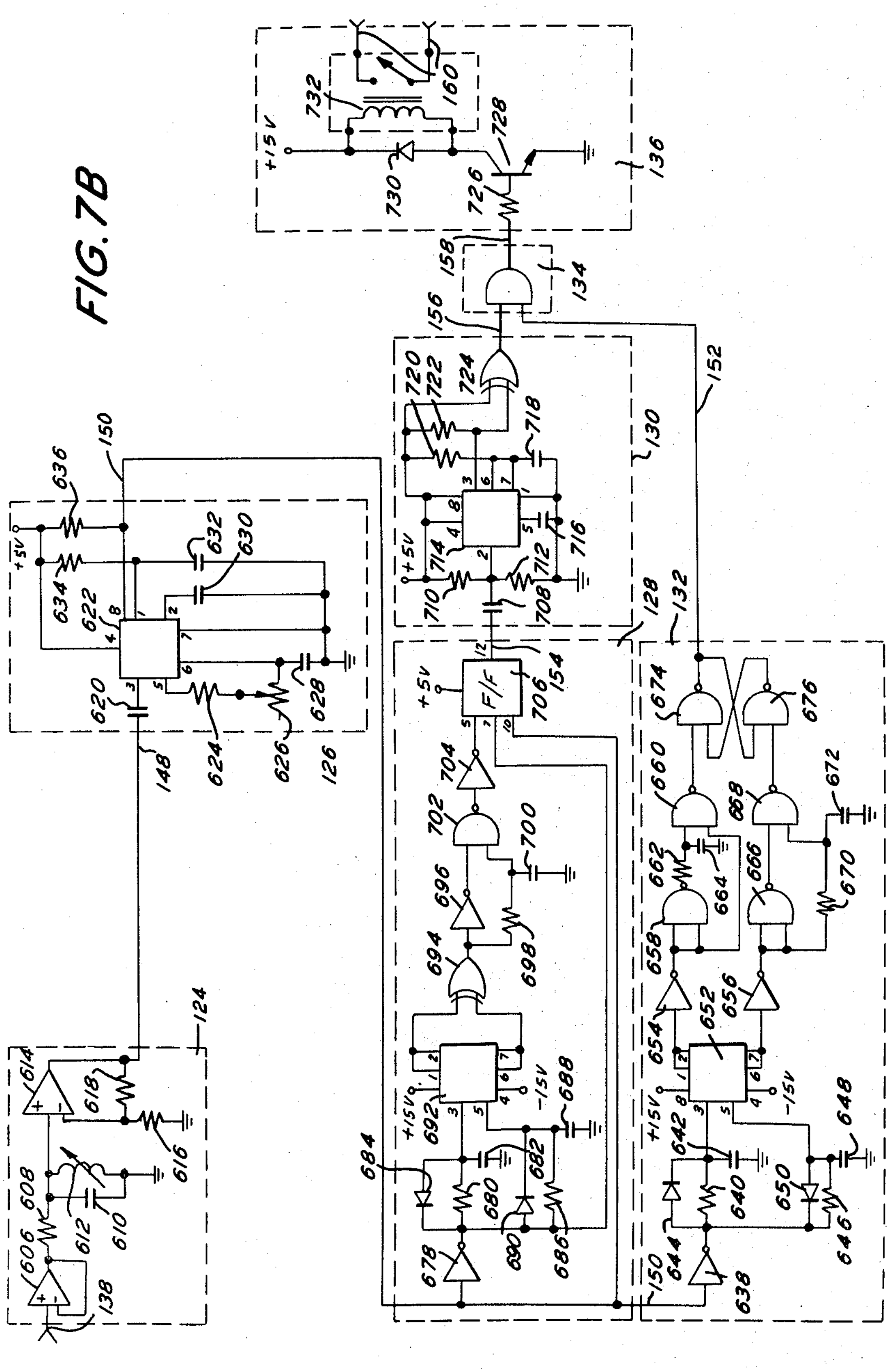
Figure 8A:
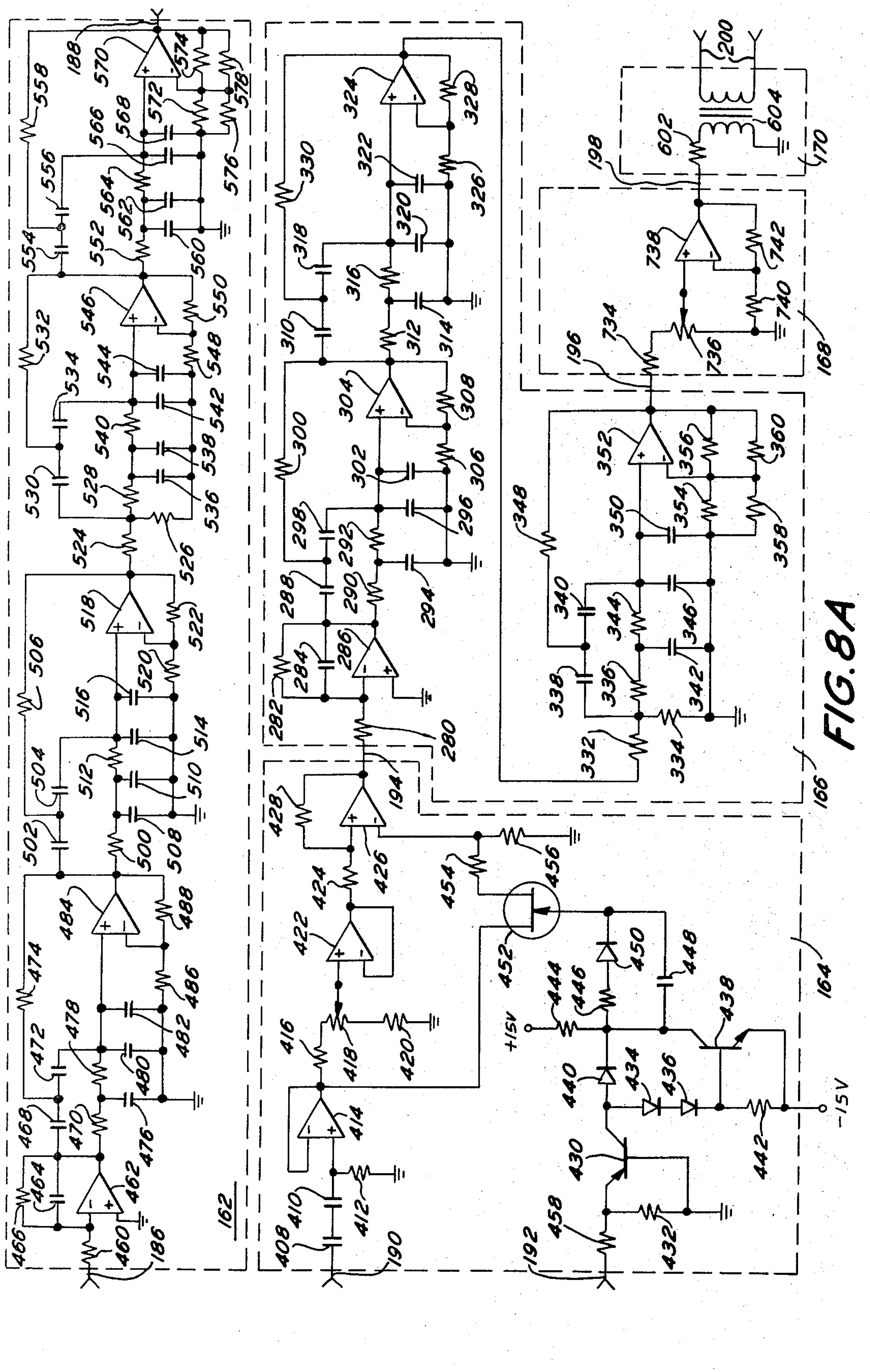
Figure 8B:
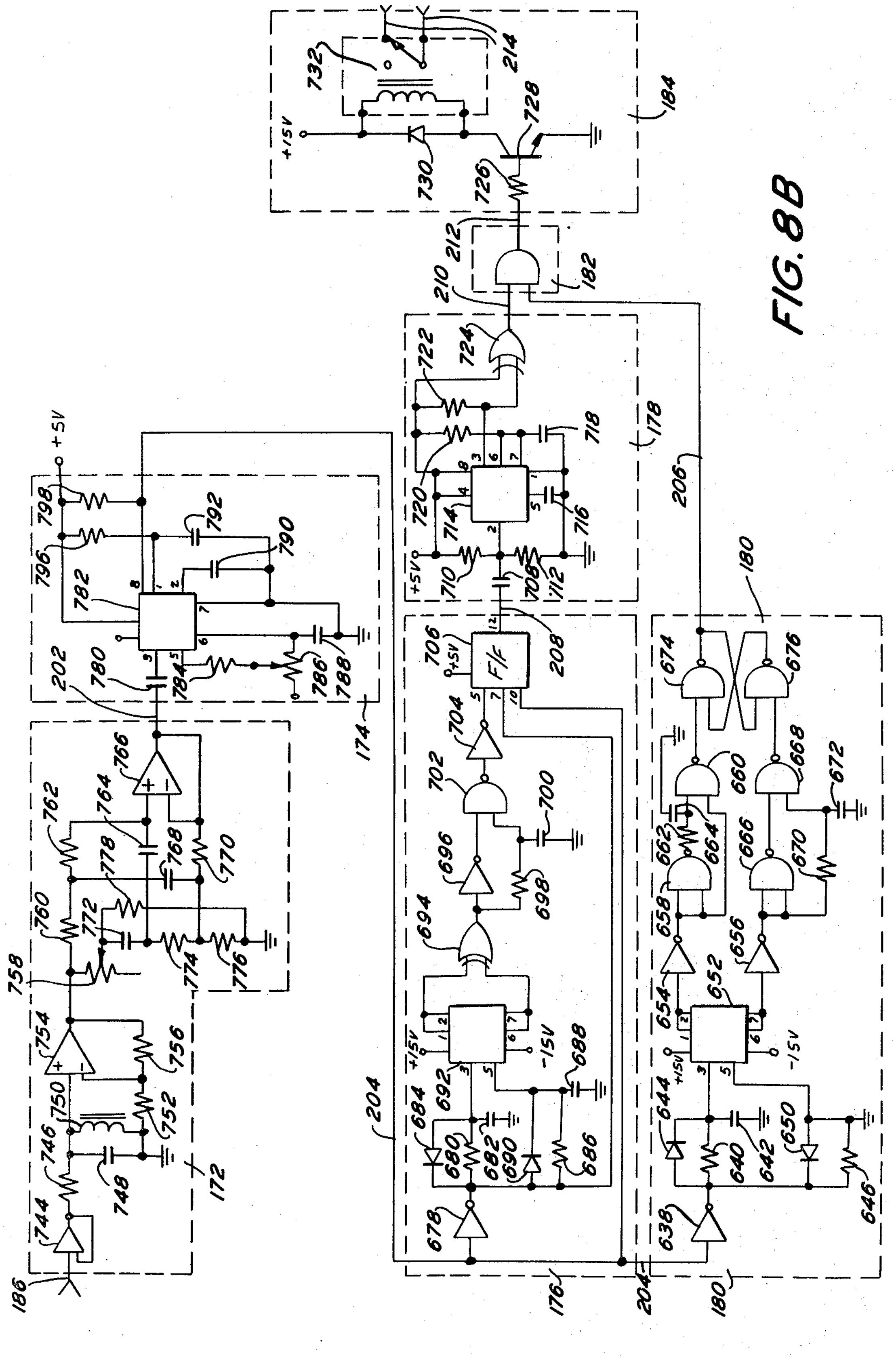
Figure 9:
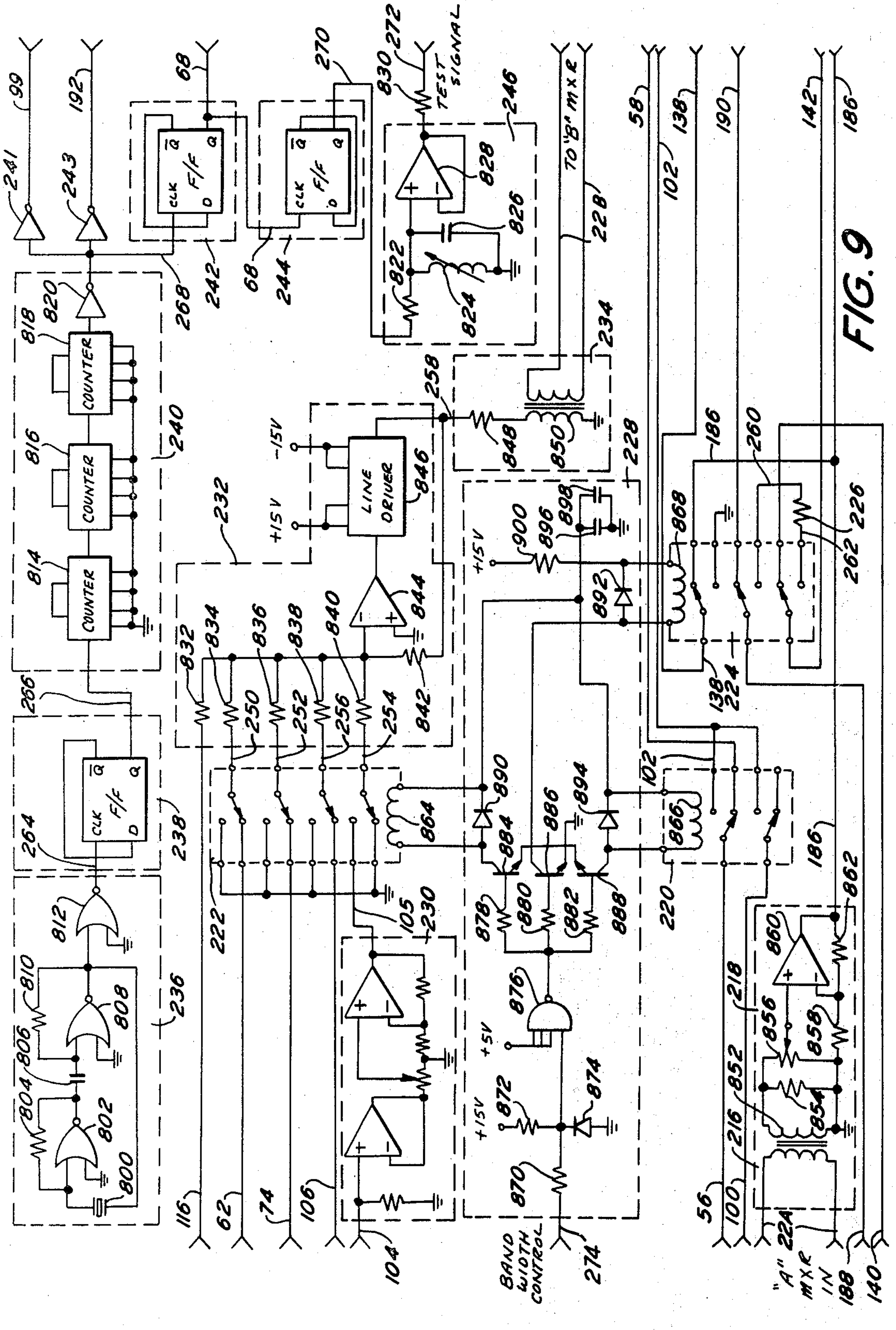
Figure 10:
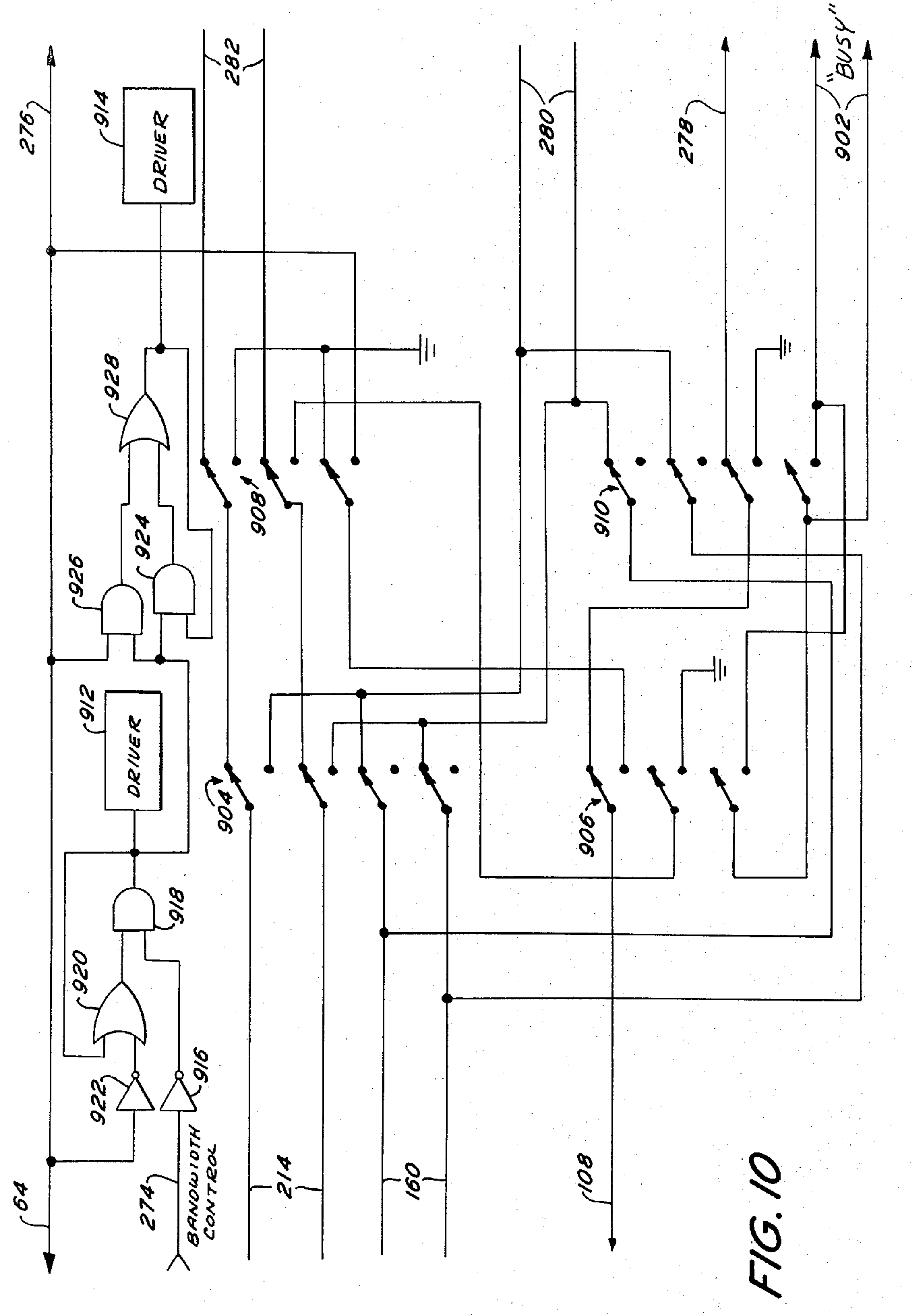

FIG. 3, comprising FIGS. 3A and 3B, is a functional block diagram of the Voice and Data Multiplexer A and the PBXA shown in FIG. 1;

FIG. 4, comprising FIGS. 4A and 4B, is a functional block diagram of the Voice and Data Multiplexer B and the PBXB shown in FIG. 1;

FIG. 5 is a schematic and logic diagram of the Transmit One Circuit shown in FIGS. 3 and 4;

FIG. 6 comprising FIGS. 6A and 6B is a schematic logic diagram of the Transmit Two Circuit shown in FIGS. 3 and 4;

FIG. 7 comprising FIGS. 7A and 7B is a schematic diagram of the Receive One Circuit shown in FIGS. 3 and 4;

FIG. 8 comprising FIGS. 8A and 8B is a schematic diagram of a portion of the Receive Two Circuit shown in FIGS. 3 and 4;

FIG. 9 is a schematic logic diagram of the Interface and Control Circuit shown in FIGS. 3 and 4; and FIG. 10 is a schematic logic diagram of the D.C. Signal Routing Circuit shown in FIGS. 3 and 4.

Referring now to the various figures of the drawing wherein like reference characters refer to like parts, there is shown in FIG. 1 a telephone system 20. The telephone system 20 basically comprises a first Voice and Data Multiplexer A (MXRA), a second Voice and Data Multiplexer B (MXRB), said multiplexers being connected together via a conventional four wire telephone line 22, which line represents a private line rented from the telephone company and which may extend over great distances. A first private branch exchange or PBXA is connected to the MXRA and a second PBXB connected to the MXRB. Three telephones A1, A2 and A3 are connected to PBXA and three telephones B1, B2 and B3 are connected to PBXB. It should be pointed out at this juncture that although three phones are connected to each PBX, it is to be understood that any number of two or more phones can be connected to each PBX in accordance with this invention.

The telephone system 20 also comprises a Narrow Band Data Modem A (DMA) connected via a bridge termination circuit 24 to two lines 22B of the four wire telephone line 22, said lines providing signals from MXRB to MXRA. The DMA is also connected via a summing circuit 26 to the other two lines, 22A, of telephone cable 22, which lines provide signals from the MXRA to the MXRB. A Narrow Band Data Modem B (DMB) is connected via a bridging termination circuit 24 to the lines 22B. The DMB is also connected via a summing circuit 26 to the lines 22A.

The system 20 shown in FIG. 1 more than doubles the information carrying capacity of the four wire telephone line 22. To that end, each voice and data multiplexer is adapted for providing, during one mode of operation called the duplex mode, two narrow band voice signals each of which carries speech signals from an associated telephone, over the telephone lines 22 within the frequency band or channel normally allotted for a single voice transmission, i.e. the common grade voice channel. In addition, the voice and data multiplexers provide signalling information within said channel to provide the narrow band voice signals to the proper receiving phone as well as data information between the data modems. In a second mode of operation called the full voice mode, the voice and data multiplexers are operative for providing a single full band voice signal, which signal has approximately twice the bandwidth of either of the narrow band signals provided during the duplex mode of operation, and data signals within said voice channel.

The bandwidth allotted by the telephone company to its customers for carrying all of the information that the customer desires to transmit and receive as well as control information required by the telephone company is of approximately 3,000 Hz. A very small portion of said bandwidth is utilized by the phone company for control purposes.

It has been found by studies of voice power generated in ordinary conversation in relation to the human ear sensitivity that a clearly understandable speech of acceptable quality can be transmitted within a frequency range that is less than one-half of the bandwidth of a common grade voice channel. Accordingly, two separate voice signals can with appropriate filtering and equalization or shaping be provided within the bandwidth of a common grade voice channel and still have enough room within said channel for dialing and data signals. Although said separate voice signals are completely intelligible, they nevertheless are of lower quality than a full bandwidth voice signal.

The voice and data multiplexer of this invention is adapted to transmit and receive within a common grade voice channel, two narrow band and separate voice signals, along with dialing information associated with each voice signal and data during the duplex mode of operation, and is also adapted to transmit and receive within said common grade voice channel during the full voice mode a full voice signal of approximately twice the bandwidth of either of the narrow band voice signals as well as dialing information associated therewith and data.

Figure 2A:
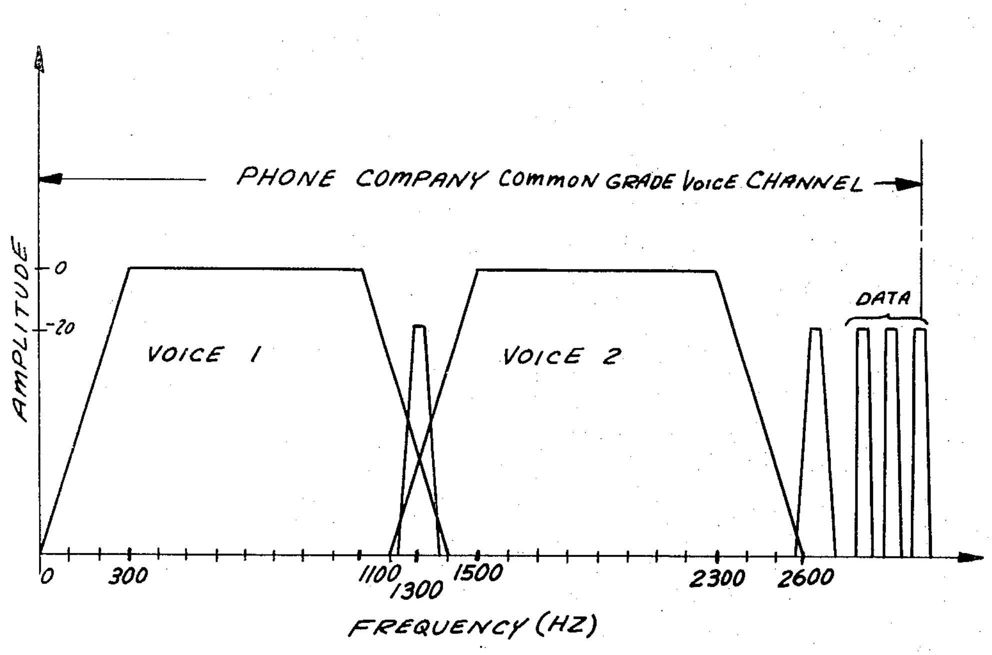
FIG. 2A is a graphical representation of voice, data and signalling spectra during one mode of operation of the system shown in FIG. 1.

In FIG. 2A there is shown, via a graphical representation of amplitude plotted against frequency, the voice, data and signalling spectra as provided within a common grade voice channel by the multiplexing system of this invention during its duplex mode of operation. As can be seen therein, a pair of narrow band voice channels is provided within the common voice channel, the lower narrow voice band extends from approximately 300 Hz to 1,100 Hz, the amplitude of said signal dropping off rapidly below 300 Hz and above 1,100 Hz. The upper narrow voice band extends from approximately 1,500 Hz to 2,400 Hz, the amplitude of said voice signal dropping off rapidly below 1,500 Hz and above 2,400 Hz. The "M" or dialing signals associated with the lower of the two narrow voice bands is placed on a narrow band carrier whose frequency lies between the upper and lower narrow bands, i.e., at 1,300 Hz. The M or dialing signals associated with the upper narrow band signal is placed on a narrow band carrier whose frequency is above the upper narrow band, i.e. 2,600 Hz. Data information is provided at three substantially equally spaced frequencies above 2,600 Hz. As can be seen, the amplitude of the dialing signals is approximately 20 DB lower than the amplitude of the pair of narrow band voice signals.

Figure 2B:
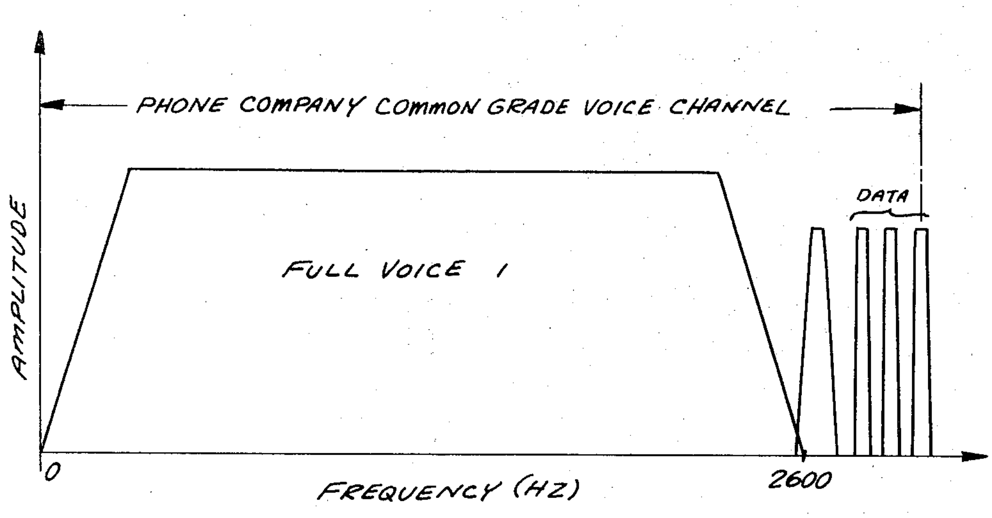
FIG. 2B is a graphical representation of voice, data and signalling spectra during another mode of operation of the system shown in FIG. 1.

FIG. 2B is a graphical representation of the full voice mode of operation of the multiplexing system shown in FIG. 1. As in FIG. 2A, amplitude is plotted against frequency. As can be seen in FIG. 2B, a full band with voice signal is provided in the common voice channel and extends from approximately 300 Hz to 2,400 Hz. The M or dialing signals associated with the full voice mode of operation are placed on the narrow band carrier whose frequency is also 2,600 Hz. Like in FIG. 2A, three data channels are provided within the common voice channel above the 2,600 Hz dialing signal frequency.

Referring now to FIGS. 3A and 3B, the functional operation of the MXRA will be considered. As can be seen therein, MXRA comprises a Transmit One Circuit 28, a Transmit Two Circuit 30, a Receive One Circuit 32, a Receive Two Circuit 34, Interface and Control Circuit 36 and a DC Signal Routing Circuit 38.

The Transmit One Circuit 28 comprises a 600 ohm interface circuit 40, an 1,100 Hz low pass filter 42, a variable attenuator 44, an input interface and threshold circuit 46, a gate 48, a 1,300 Hz bandpass filter 50, and a variable attenuator 52.

The 600 ohm interface circuit 40 is connected via a pair of lines 54 from the PBXA. A line 56 is connected between the output of the 600 ohm interface and an input of the Interface and Control Circuit 36. A line 58 is connected between an output of the Interface and Control Circuit 36 and the input of the 1,100 Hz low-pass filter 42. The output of the 1,100 Hz low-pass filter 42 is connected to the input of the variable attenuator 44 via line 60. The output of the variable attenuator 44 is connected to an input of the Interface and Control Circuit 36 via line 62. A line 64 is connected to the input of the interface and threshold circuit 46. The line 64 is an output of the D.C. Signal Routing Circuit 38. The output of the interface and threshold circuit 46 is connected via line 66 to an input of gate 48. The gate 48 includes another input which is connected via line 68 to the Interface and Control Circuit 36. The output of the gate is connected via line 70 to the input of the 1,300 Hz bandpass filter 50. The output of the 1,300 Hz bandpass filter is connected via line 72 to the input of variable attenuator 52, the output of which is connected via line 74 to an input of the Interface and Control Circuit 36.

The Transmit Two Circuit 30 includes a 600 ohm interface circuit 76, an 1,100 Hz low-pass filter 78, a balanced modulator 80, a 2,400 Hz low-pass filter 82, a variable attenuator 84, an input interface and threshold circuit 86, a gate 88, a 2,600 Hz bandpass filter 90, and a variable attenuator 92. A pair of lines 94 are connected between the PBXA and the input to the 600 ohm interface circuit 76. The output of the 600 ohm interface circuit 76 is connected via line 96 to the input of the 1,100 Hz low-pass filter 78. The output of the 1,100 Hz low-pass filter is connected via line 98 to an input of the balanced modulator 80. Another input to the balanced modulator is connected, via line 99, to an output of the Interface and Control Circuit 36. Line 99 is also connected to one input of gate 88. The output of the balanced modulator 80 is connected via line 100 to an input of the Interface and Control Circuit 36. A line 102 is connected between an output of the Interface and Control Circuit 36 and the input to the 2,400 Hz low-pass filter 82. The output of the 2,400 Hz low-pass filter is provided via a line to the input of attenuator 84 and via line 104 to an input of the Interface and Control Circuit 36. The output of attenuator 84 is connected via line 106 to an input of the Interface and Control Circuit 36. A line 108 is connected to the input interface and threshold circuit 86. The line 108 is an output of the D. C. Signal Routing Circuit 38. The output of circuit 86 is connected via line 110 to an input of gate 88. The output of gate 88 is connected via line 112 to the input of the 2,600 Hz bandpass filter 90. The output of the bandpass filter 90 is connected via line 114 to the input of attenuator 92, the output of which being connected via line 116 to an input of the Interface and Control Circuit 36.

The Receive One Circuit 32 comprises an 1,100 Hz low-pass filter 118, a variable amplifier 120, a 600 ohm interface 122, a 1,300 Hz bandpass filter 124, a 1,300 Hz tone detector 126, a pulse width discriminator 128, a dial pulse normalizer 130, an on/off hook detector 132, a gate 134, and a relay driver and relay 136. The inputs to the 1,100 Hz low-pass filter 118 and the 1,300 Hz bandpass filter 124 are connected together to line 138. Line 138 is connected to an output of the Interface and Control Circuit 36. The output of the 1,100 Hz low-pass filter 118 is connected via line 140 to an input of the Interface and Control Circuit 36. A line 142 is connected between an output of the Interface and Control Circuit 36 and the input to variable amplifier 120. The output of variable amplifier 120 is connected via line 144 to the input of the 600 ohm interface circuit 122. The output of the 600 ohm interface circuit 122 is connected via lines 146 to PBXA. The output of the 1,300 Hz bandpass filter 124 is connected via line 148 to the 1,300 Hz tone detector 126. The output of the 1,300 Hz tone detector is connected to line 150. Line 150 is connected to the inputs of the pulse width discriminator 128 and the on/off hook detector 132. The output of the on/off hook detector is connected via line 152 to one input of gate 134. The output of the pulse width discriminator 128 is connected via line 154 to the input of the dial pulse normalizer 130. The output of the dial pulse normalizer is connected via line 156 to another input to gate 134. The output of gate 134 is connected via line 158 to relay driver and relay circuit 136. The output of the relay driver and relay circuit 136 is connected via lines 160 to the D. C. Signal Routing Circuit 38.

The Receive Two Circuit 34 comprises a 2,400 Hz low-pass filter 162, a balanced modulator 164, an 1,100 Hz low-pass filter 166, a variable amplifier 168, a 600 ohm interface circuit 170, a 2,600 Hz bandpass and 2,670 notch filter 172, a 2,600 Hz tone detector 174, a pulse width discriminator 176, a dial pulse normalizer 178, an on/off hook detector 180, a gate 182 and a relay driver and relay circuit 184.

A line 186 is connected from an output of the Interface and Control Circuit 36 to the input of the 2,400 Hz low-pass filter 162 and the 2,600 Hz bandpass filter 172. The output of the 2,400 Hz low-pass filter 162 is connected via line 188 to an input to the Interface and Control Circuit 36. An output of the Interface and Control Circuit 36 is connected via line 190 to one input of the balanced modulator 164. Another input to the balanced modulator 164 is connected via line 192 from an output of the Interface and Control Circuit 36. The output of the balanced modulator 164 is connected via line 194 to the 1,100 Hz low-pass filter 166. The output of the 1,100 Hz low-pass filter 166 is connected via line 196 to the input of variable amplifier 168. The output of the variable amplifier 168 is connected via line 198 to the input to the 600 ohm interface circuit 170. The output of the 600 ohm interface circuit 170 is connected via lines 200 to PBXA. The output of the 2,600 Hz band pass filter 172 is connected via line 202 to the 2,600 Hz tone detector 174. The output of the tone detector is connected via lines 204 to the input of the pulse width discriminator 176 and the input of the on/off hook detector 180. The output of the on/off hook detector 180 is connected via line 206 to one input to gate 182. The output of the pulse width discriminator 176 is connected via line 208 to the dial pulse normalizer 178. The output of the dial pulse normalizer 178 is connected via line 210 to another input to gate 182. The output of gate 182 is connected via line 212 to the input of the relay driver and relay circuit 184, the output of which is connected via lines 214 to the D. C. Signal Routing Circuit 38.

The Interface and Control Circuit 38 is shown in FIGS. 3 and 4 and comprises a 600 ohm interface circuit 216, a variable amplifier 218, a relay 220 having plural contacts, a relay 222 having plural contacts, a relay 224 having plural contacts, an attenuator 226, a relay driver 228, a variable amplifier 230, a linear combiner 232, a 600 ohm interface circuit 234, a 5.2 mega Hz oscillator 236, a divide-by-two circuit 238, a divide-by-1000 circuit 240, a divide-by-two circuit 242, a divide-by-two circuit 244, and a 650 Hz bandpass filter 246.

In a symbology used in FIG. 3 and FIG. 4 to indicate normally opened and normally closed relay contacts, the normally closed relay contacts are indicated by a vertical line therebetween and the normally opened contacts are indicated by an X therebetween.

The input to the 600 ohm interface circuit 216 is provided via the lines 22A. The output of the 600 ohn interface is provided via line 248 to the input of the variable amplifier 218. The output of variable amplifier 218 is connected to line 186 which is connected to the inputs of the 2,400 Hz low-pass filter circuit 162 and the 2,600 Hz band-pass filter circuit 172 of the Receive Two Circuit 34. Line 186 is connected via a normally closed pair of contacts of relay 224 to line 138, which line is connected to the inputs to the 1,100 Hz low-pass filter 118 and the 1,300 Hz bandpass filter 124 of Receive One Circuit 32.

The output line 56 of the Transmit One Circuit 28 is connected via a pair of normally closed contacts of relay 220 to input line 58 of the Transmit One Circuit. Line 56 is isolated from line 102 by a pair of normally opened contacts of relay 220. Output line 100 of the Transmit Two Circuit 30 is connected via a pair of normally closed contacts of relay 220 to line 102 which serves as an input to the 2,400 Hz low-pass filter 82 of the Transmit Two Circuit 30.

The output line 62 of the Transmit One Circuit 28 is connected via a pair of normally closed contacts of relay 222 to line 250, which line is connected to one input of linear combiner 232. Output line 74 of the Transmit One Circuit 28 is connected via another pair of normally closed contacts of relay 22 to line 252, which line is connected as another input to the linear combiner 232. The output line 104 from the Transmit Two Circuit 30 is connected to the input of the variable amplifier 230. The output of the variable amplifier is connected via line 105 and to one side of a pair of normally opened contacts of relay 222. The other side of the contacts is connected to line 254. Line 254 is connected to another input of the linear combiner 232. The output line 106 of the Transmit Two Circuit 30 is connected via a pair of normally closed contacts of relay 222 to line 256, which line is connected to another input of the linear combiner 232. Output line 116 of the Transmit Two Circuit 30 is connected directly to another input of the linear combiner 232. The output of the linear combiner is connected to line 258, which line serves as the input to the 600 ohm interface circuit 234. The output of the 600 ohm interface circuit 234 is provided to the pair of lines going to the input of the MXRB, i.e. lines 22B.

The output line 140 from the 1,100 Hz low pass filter 118 of the Receive One Circuit 32 is connected via a pair of normally closed contacts of relay 224 to input line 142 going to the variable amplifier 120 of the Receive One Circuit 32. Line 188, which serves as an output of the 2,400 Hz low-pass filter of Receive Two Circuit 34, is connected via a pair of normally closed contacts of relay 224 to line 190 which serves as the input to the balanced modulator 164 of the Receive Two Circuit 34. A pair of normally open contacts of relay 224 serve to isolate line 188 from line 260 which is connected to the input of attenuator 226. The output of the attenuator is connected to line 262. Line 262 is isolated from line 142, which line is connected to the variable amplifier 120 of the Receive One Circuit 32, by a pair of normally opened contacts of relay 224.

The output of the 5.2 mega Hz oscillator is connected via line 264 to the divide-by-two circuit 238. The output of the divide-by-two circuit 238 is connected via line 266 to the divide-by-one thousand circuit 240. The output of the divide-by-1,000 circuit 240 is connected to line 268 which serves as an input to an inverter 241. The output of the inverter is connected via line 192 to one input of the balanced modulator 164 of the Receive Two Circuit 34. Line 268 also serves as the input to inverter 243, whose output is connected via line 99 to one input of the balanced modulator circuit 80 and the gate circuit 88 of the Transmit Two Circuit 30. Line 268 is also connected to the input of divide-by-two circuit 242. The output of the divide-by-two circuit 242 is connected via line 68 to one input of the gate 48 of the Transmit One Circuit 28. Line 68 is also connected as the input to the divide-by-two circuit 244, the output of which is connected via line 270, to the input of the 650 Hz bandpass filter 246. The output of the 650 Hz band pass filter is connected to line 272 which serves as a test signal output line.

As can be seen in FIG. 3A, the D. C. Router Circuit 28 includes an input connected to line 274. Line 274 serves as a bandwidth control signal input line. A pair of input lines 276 and 278 are connected between the PBXA and the D. C. router circuit 38. Two pairs of output lines 280 and 282 are connected between the D. C. Signal Router Circuit 238 and the PBXA.

The MXRA is constructed and arranged in an identical manner as the MXRB and is connected to PBXB in a similar manner that PBXA is connected to the MXRA. The MXRB is shown in FIG. 4.

The operation of the multiplexing system in the duplex mode of operation will best be understood with reference to FIGS. 1, 3 and 4. It shall be assumed that phone A1 is to communicate with phone B2 and that phone A3 is to communicate with phone B2.

The bandwidth control input lines of each multiplexer is provided with a logically high signal by a suitable switch on the phone. The bandwidth control signal is utilized to cause the normally opened contacts in the Interface and Control Circuit 36 to close and the normally closed contacts to open. The bandwidth control signal also causes normally opened relay contacts in the D. C. Signal Router Circuit 38 to close and normally closed contacts therein to open. This arranges the system in the condition shown in FIGS. 3 and 4.

Upon phone A1's hand set being lifted from its cradle, the M lead (not shown) of the phone A1 goes to minus 48 volts DC. This is denoted as an off hook condition. The minus 48 volt signal is routed by the PBXA to either line 276, which line is the signalling line for the lower narrow bandwidth voice signal, called voice 1, if that line is not being used or if that line is being used to line 278 which is the signalling line for the upper narrow bandwidth voice signal called voice 2. For the purpose of this example, it is assumed that at the time that A1 goes off hook, neither narrow voice bands are being used. Accordingly, line 276 goes to minus 48 volts DC. In the duplex mode of operation, the D. C. Signal Router Circuit 38 is arranged such that line 276 is connected to line 64, whereupon the minus 48 volt signal appears on line 64 at the input interface and threshold circuit 46. Circuit 46 of Transmit One is operative for providing a logically low signal at its output on line 66 when the input on line 64 is at minus 48 volts. The low signal appearing on line 66 disables gate 48 from passing any signals therethrough. Prior to phone A1 going off hook, line 66 is at a logically high state, whereupon 1,300 Hz square waves are provided via line 68 into the gate and through the gate to line 70.

The 1,300 Hz square waves are provided in the following manner: The 5.2 mega Hz oscillator 236 provides square waves at a frequency of 5.2 mega Hz via line 264 into a divide-by-two circuit. The divide-by-two circuit provides square waves at a frequency of 2.6 mega Hz via line 226 into the divide-by-1,000 circuit 240. The divide-by-1,000 circuit 240 provides 2,600 Hz square waves via line 268 into the divide-by-two circuit 242. The divide-by-two circuit 242 provides the 1,300 Hz square waves into line 268.

Prior to phone A1 going off hook, gate 48 is enabled by the high signal appearing on line 66, whereupon the 1,300 Hz square wave appears on line 70. This signal passes through a 1,300 Hz bandpass filter 50 where it is converted into a 1,300 Hz sine wave. The 1,300 Hz sine wave passes through line 72 and variable amplifier 52 where it is attenuated and provided as an input on line 74. Line 74 carries the 1,300 Hz sine wave or tone via a pair of normally closed contacts of relay 222 of the Interface and Control Circuit 36 to line 252 and from there into the linear combiner 232. The 1,300 Hz tone passes through the linear combiner and appears at its output 258 and passes through the 600 ohm interface circuit 234. The 600 ohm interface circuit serves to match the impedance of the multiplexing system circuitry to the 600 ohm telephone lines. The 1,300 Hz tone thus appears on telephone lines 22B which are provided as inputs to the MXRB.

Referring now to FIGS. 4A and 4B, it can be seen that the 1,300 Hz tone provided on lines 22B passes through the 600 ohm interface 216 of MXRB through line 248, variable amplifier 218 and into line 186. Line 186 is connected via a pair of normally closed contacts of relay 224 to line 138 which serves as the inputs to the 1,100 Hz low-pass filter circuit 118 and the 1,300 Hz band filter circuit 124 of the Receive One Circuit 32 of MXRB. Furthermore, line 180 is directly connected to the inputs to the 2,400 Hz low-pass filter 162 and the 2,600 Hz bandpass filter 172 of the Receive Two Circuit 34 of the MXRB. The 1,300 Hz tone is enabled to pass through the bandpass filter 124 of Receive One Circuit 32 and from there to the 1,300 Hz tone detector 126. The 1,300 Hz tone detector provides a logic low signal at its output line 150 when a 1,300 Hz tone is present and provides a logic high signal at line 150 when the 1,300 Hz tone is absent. The on/off hook detector 132 monitors the state of line 150. In the on hook condition, the on/off detector provides a signal on line 152 which disables gate 134. Once disabled, gate 134 is prevented from passing any signals therethrough. The output of the gate is connected to the relay driver and relay circuit 136. When the gate 134 is disabled, the output of the relay driver circuit appearing on lines 160 is de-energized. Lines 160 are the E leads associated with voice one and are connected to inputs of routing circuit 38 of the MXRB. These E lead signals pass through the D.C. Signal Routing Circuit 38 and are provided on lines 280 connecting the Signal Routing Circuit 38 with PBXB. Lines 280 are the E leads associated with voice one.

As will be appreciated by those skilled in the art, E leads are those leads which are connected to the telephone to cause the telephone to ring when said leads are energized. Accordingly, when phone A1 is on hook none of the E leads to telephones B1, B2 or B3 will be energized and none of the phones will ring. When telephone A1 goes off hook, the input interface and threshold circuit 46 of the Receive One Circuit 28 of MXRA disables gate 48, thereby precluding a 1,300 Hz tone from being transmitted to MXRB. The absence of the 1,300 Hz tone on line 138 in MXRB is detected by the 1,300 Hz tone detector 126 of the Receive One Circuit 32 of the MXRB, whereupon line 150 goes high. If line 150 stays high for 200 milliseconds, thereby indicating a valid off hook condition, the on/off hook detector 132 provides a signal on line 152 to enable gate 34 to pass dialing signals from the dial pulse normalizer 130 therethrough.

The dialing signals or pulses are utilized to determine which receiving telephone is to be rung. As will be appreciated by those skilled in the art, upon telephone A1 being dialed, a series of minus 48 volt DC to ground pulses are provided on the M lead line at a frequency between 8 and 14 Hz, depending upon the dialing rate. These dialing pulses pass via line 64 into the input interface and threshold circuit 46 thereby intermittantly disabling and enabling gate 48. Accordingly, during dialing, the output of the gate as provided on line 70 comprises bursts of 1,300 Hz square waves, which bursts are at the dialing frequency. The 1,300 Hz square waves in each pulse burst are converted into sine waves by the 1,300 Hz bandpass filter 50 and the resulting dial pulses are attenuated by amplifier 52 and provided on line 74, through a pair of closed contacts of relay 222 of the Interface and Control Circuit 36 and into the linear combiner 232. These signals appear at the output 258 of the linear combiner, pass into the 600 ohm interface 234 and into lines 22B, which lines are the input lines of the B multiplexer. The dialing pulses are received via line 138 of the MXRB and pass through the 1,300 Hz bandpass filter 124 and the 1,300 Hz tone detector 126, whereupon the signals are converted in negative going pulses. The negative pulses are provided via line 150 into the pulse width discriminator 128.

The pulse width disciminator determines if the pulses are of at least 15 milliseconds duration, dialing pulses normally being at least 50 milliseconds long, and if so said pulses are provided to a dial pulse normalizer. The dial pulse normalizer converts the dial pulses into pulses having a 40 millisecond ON interval and a 60 millisecond OFF interval. This is the normal dial pulse ratio of the telephone company. The normalized dial pulses are provided via line 156 through enabled gate 134 into line 158. The dial pulses result in the actuation of the relay driver and relay 136, whereupon dialing pulses appear on lines 160. The pulses appearing on lines 160 pass through the D.C. Signal Routing Circuit 38 of MXRB and through lines 280 into PBXB. The PBXB responds to the dialing pulses to energize the E leads of the phone corresponding to the dialing pulse information received, in this case to ring telephone B2. Once the hand set of telephone B2 is removed from its cradle, the 1,300 Hz tone normally provided from the MXRB disappears in the same manner as discussed with reference to the MXRA.

The narrow band voice signals are transmitted between the phones A1 and B2 in the following manner: The voice signals corresponding to the frequency spectrum of the voice speaking into the A1 telephone is routed by PBXA into input lines 54 of the Transmit One Circuit 28 of MXRA. The voice signals pass through the 600 ohm interface circuit 40 and into line 56. The signals pass through line 56 through a pair of normally closed contacts in relay 220 of the associated Interface and Control Circuit 36 and out through line 58. The signals appearing on line 58 enter the 1,100 Hz low pass filter 42 in the Transmit One Circuit 42 of the MXRA. This filter limits the input voice signal to a narrow band signal from DC to 1,100 Hz and enables the narrow band signal to pass therethrough to line 60. The narrow band signals are attenuated by attenuator 44 and provided on line 62. Line 62 is connected via a pair of normally closed contacts of relay 222 in the associated Interface and Control Circuit 36 to line 252. Line 252 serves to provide the narrow bandwidth voice signals into the linear combiner 232. The narrow bandwidth voice signals pass through the linear combiner, into line 258 and from there through the 600 ohm interface 234 into lines 22B.

The voice signals pass through lines 22B and into the input to the MXRB. Once in the MXRB, the narrow band voice signal is passed through the 600 ohm interface circuit 216 of the Interface and Control card 36, and through line 248 to variable attenuator 218 where the signals are attenuated and provided on line 186. The signals appearing on line 186 are provided via a pair of normally closed contacts of relay 224 in the Interface and Control Circuit 36 to line 138 therein. Line 138 serves as the input to the 1,100 Hz low-pass filter 118 of the Receive One Circuit 32 in the MXRB. The DC to 1,100 Hz voice signals are enabled to pass through the 1,100 Hz low-pass filter and to line 140. The signals pass through line 140, through a pair of normally closed contacts in relay 224 of the associated Interface and Control Circuit 36 to line 142. The signals thus appearing on line 142 are fed back to the variable amplifier 120 in the Receive One Circuit 32 where the signals are amplified and provided on line 144 to the 600 ohm interface circuit 122. The DC to 1,100 Hz signals thus appear on lines 146 which are the outputs of circuit 122 and the voice one input to the PBXB. The PBXB routes the DC 1,100 Hz narrow voice band signals to telephone B2. Narrow band voice signals from telepone B2 pass to telephone A1 in a similar manner.

Assuming now that telephone A3 goes off hook and dials the correct dialing information to communicate with telephone B2, operation occurs as follows: When telephone A3 goes off hook, the PBXA routes the minus 48 volt DC M lead signal to line 278 which is the M lead associated with voice two. The signal passes through the DC Routing Circuit 238 in the MXRA to line 108. Line 108 is an input line of the Transmit Two Circuit 30. The input interface and threshold circuit 86, gate 88 and the 2,600 Hz bandpass filter 90 in the Transmit Two Circuit 80 of the MXRA operate in a similar manner to the corresponding input interface and threshold circuit 46, gate 48 and 1,300 Hz bandpass filter in the Transmit One Circuit 28 of the MXRA, save for the fact that the output appearing on line 116 from the 2,600 Hz bandpass filter is a 2,600 Hz tone when the phone associated therewith is on hook. When the phone associated therewith is off hook, the tone disappears. During dialing of said phone, bursts of 2,600 Hz sine waves at the dialing frequency are provided on line 116. The dialing pulse information provided on line 116 passes directly to the linear combiner 232 in the Interface and Control Circuit 36 of the MXRA and through the associated 600 ohm interface 234 into lines 22B, which lines carry the dialing pulses to the MXRB. The dialing pulses enter the MXRB and pass through its 600 ohm interface circuit 216 and appear at output line 248 where they are attenuated by attenuator 218 and provided on line 186. Line 186 serves as the input to the 2,600 Hz bandpass filter 172 of the Receiver Two Circuit 34. Upon the disappearance of the 2,600 Hz tone on line 186, thereby indicating that another A telephone has gone off hook, the 2,600 Hz tone detector 174 provides a high signal to the on/off hook detector 180. Assuming that the tone has disappeared for at least 200 milliseconds, the on/off hook detector 180 provides a signal, via line 206, to the gate 182 thereby enabling the gate. The dial pulses carried by line 186 pass through the pulse width discriminator since said dialing pulses are at least of 15 milliseconds duration and appear on line 208. Line 208 serves as the input to the dial pulse normalizer 178 which normalizes the dial pulses in a similar manner to dial pulse normalizer 130 and provides the normalized pulses through the enabled gate 182 and via line 212 to the relay driver and relay circuit 184. The relay driver and relay circuit 184 is energized, thereby energizing leads 214. Leads 214 are the E leads associated with voice two and are connected to inputs of the associated DC Signal Routing Circuit. In the duplex mode of operation, the E leads are connected to lines 282 which are input E leads to the PBXB. In response to the dialing pulses on lines 282, the PBXB energizes the E leads of telephone B2.

Once the E leads associated with telephone B2 are energized, the telephone rings. Upon the hand set of telephone B2 being removed from its cradle, the 2,600 Hz tone provided by the Transmit Two Circuit 30 of the MXRB ceases.

Voice communication between telephone A3 and telephone B2 occurs in the following manner: The voice signal from telephone A3 passes to PBXA. The PBX routes the voice signals into lines 94 which serve as the input into the Transmit Two Circuit 30 of the MXRA. The voice signals entering the Transmit Two Circuit 30 pass through the 600 ohm interface circuit 76 and appear at line 96. The signals appearing on line 96 pass through the 1,100 Hz low-pass filter 78, whereupon the input signals are limited to a narrow band signal of a DC to 1,100 Hz bandwidth. The narrow bandwidth signals are enabled to pass via line 98 to the input of a balanced modulator 80. The modulator is operative to modulate the input signals appearing on line 98 with a 2,600 Hz input signal provided via line 99 from the divide-by-one thousand circuit 240 in the Interface and Control Circuit 36 of the MXRA to effect the translation of the input signals to a higher frequency range within the common voice channel. To that end, the modulator provides two side band signals, those being the sum and difference signals of the input signal as modulated by the 2,600 Hz signal, at its output line 100. The two side bands signals appearing on line 100 consist of a side band from 1,500 Hz to 2,600 Hz and the side band from 2,600 Hz to 3,700 Hz. The two side bands pass from line 100 through a normally closed set of contacts of relay 220 in the associated Interface and Control Circuit 36 to line 102 and from said line back to the 2,400 Hz low-pass filter 82 in the Transmit Two Circuit 30.

The 2,400 Hz low-pass filter 82 is effective for removing the 2,600 to 3,700 Hz side band and for limiting the 1,500 Hz to 2,600 Hz side band to 1,500 Hz to 2,400 Hz. The 1,500 Hz to 2,400 Hz bandwidth serves as the upper narrow voice signal. This signal is provided at the output of the low-pass filter on line 104 and is carried by said line to the input of variable amplifier 230. As can be seen, the output of the variable amplifier is separated from line 254 via a pair of normally opened contacts of relay 222 in the Interface and Control Circuit 36. Line 104 also serves as the input to variable amplifier 84 in the Transmit Two Circuit 30 of the MXRA where the signal is attenuated and provided on line 106.

Line 106 is connected via a pair of normally closed contacts of relay 222 in the Interface and Control Circuit 36 of the MXRA to line 256, which line serves as an input to the linear combiner 232 therein. The output of the linear combiner thus carries the 1,500 to 2,400 Hz upper narrow band voice signals to the 600 ohm interface 234 from whence said signals are provided on line 22B to the input of the MXRB. The voice signals appearing at the input to the MXRB pass through the 600 ohm interface circuit 216 in the associated Interface and Control Circuit 36 from whence they pass via line 248 to the input of variable amplifier 218. The signals are attenuated by variable attenuator 218 and provided on line 186. The signals appearing on line 186 pass through the 2,400 Hz low-pass filter 162 in the Receive Two Circuit 34 and enter line 188. The signals pass from line 188 through a pair of normally closed contacts in relay 224 of the Interface and Control Circuit 36 to line 190 which serves as the input to the balanced modulator 164 in the Receive Two Circuit 34 of the MXRB which serves to translate the upper narrow band signals down to a lower frequency range. The balanced modulator modulates the input signal with the 2,600 Hz modulating signal provided via line 192 from the divide-by-1,000 circuit 240 in the associated Interface and Control Circuit 36 to produce two side band signals, one of said side bands being from 200 Hz to 1,100 Hz and the other of said side bands being from 4,100 Hz to 5,000 Hz. The two side band signals are provided at the output of the balanced modulator on line 194 and serve as the input to an 1,100 Hz low-pass filter 166. Filter 166 enables the lower side band signals to pass therethrough but prevents the upper side band signals from passing. Accordingly, the 200 to 1,100 Hz signals appear at the output on line 196. As should thus be appreciated, the balanced modulator in combination with the 1,100 Hz low-pass filter has the effect of translating the upper narrow voice signals down to the frequency band at which said signals were initially produced. The narrow voice signals appearing on line 196 are attenuated by variable attenuator 168 and provided via line 198 to the 600 ohm interface circuit 170. The output of the 600 ohm interface circuit is provided via lines 200 and carries the narrow voice signals to the PBXB. The PBXB routes the voice signals to telephone B2.

Data signals are carried between the A and B multiplexers during both modes of operation in the following manner: Assuming that the A data modem is providing three data signals at frequencies above 2,600 Hz as shown in FIG. 2A. These signals are provided into the summing circuit 26 and are combined with the output signals from the 600 ohm interface circuit 234 carrying voice and signalling information from the multiplexers. The total signals thus appearing on line 22B is like that shown in FIG. 2A. The data signals appearing within the common grade voice channel, are coupled via bridge termination 24 to data modem B where they are decoded. Data modem B sends data signals to data modem A in a similar manner.

The full voice mode of operation of the multiplexing system 20 is as follows: Assuming that phone A1 is to communicate with phone B2 in the full voice mode and that all phones are on hook. A1 calls phone B1 in the duplex mode of operation as heretofore described. A1 and B1 both switch band control switches (not shown) on their telephone to the full voice position. This has the effect of switching the state of closure of the contacts in relays 220, 222 and 224 in the associated Interface and Control Circuits 36 to the opposite position from that shown in FIGS. 3 and 4. The voice signals pass through the multiplexing system in the following manner: The voice signals from phone A1 pass through PBXA to lines 54 which are the voice input lines to the Transmit One Circuit 28 of the MXRA. The voice signals pass through 600 ohm interface circuit 40 and exit on line 56. Line 56 is connected via a now closed pair of contacts of relay 220 in the Interface and Control Circuit 36 to line 102. Line 102 serves as the input to the 2,400 Hz low-pass filter 82 in the Transmit Two Circuit 30 of the MXRA. Accordingly, voice signals from DC to 2,400 Hz are enabled to pass through the low-pass filter 82 and to line 104. The signals appearing on line 104 are attenuated by variable attenuator 230 and coupled via the now closed pair of contacts of relay 222 in the Interface and Control Circuit of the MXRA to line 254. Line 254 is an input to the linear combiner. The DC of 2,400 Hz voice signal, called the full voice signal, passes via line 258 to the 600 ohm interface 234 and from there to lines 22B. Lines 22B carry the full voice signal to the MXRB.

Once in the MXRB, the full voice signals pass through 600 ohm interface circuit 216 of the associated Interface and Control Circuit 36 and from there to line 248. The signals appearing on line 248 are amplified by variable amplifier 218 and provided on line 186. Line 186 is isolated from line 138 by a pair of now open contacts of relay 224, but is directly connected to the input of the 2,400 Hz low-pass filter 162 of the Receive Two Circuit 34 in the MXRB. The full voice signals pass through filter 162 to line 188. The signals appearing on line 188 are enabled to pass through a pair of now closed contacts in relay 224 of the associated Interface and Control Circuit 36 to line 260 thereof. Line 260 carries the full voice signals to attenuator 226 where said signals are attenuated and provided at line 262. Line 262 is connected, via a now closed pair of contacts of relay 224, to line 142. Line 142 is connected to the variable amplifier 120 in the Receive One Circuit 34 of the MXRB. The full voice signals are amplified by amplifier 120 and provided on line 144. Line 144 serves to carry the signals to the 600 ohm interface circuit 122. The output of the 600 ohm interface circuit 122 is provided via lines 146. Line 146 carries the full voice signals into PBXB from where it is routed to phone B1. Accordingly, phone A1 and B1 are connected in the full voice mode of operation.

After having established a full band communication between telephone A1 and B1, both telephones are hung up in order that a full voice communication can be established between telephone A1 and telephone B2. Upon telephones A1 and B1 being hung up, i.e. placed back on hook, normally open contacts in relays in the D. C. Signal Routing Circuits 38 associated with each multiplexer close and normally closed contacts therein open. As a result of such action, line 276 which is the M lead output from the PBX associated with voice one remains connected to line 64 which is the M lead input to the Transmit One Circuit 28 of the associated multiplexer and is also connected to line 108 which is the M lead input to the Transmit Two Circuit 30 in the multiplexer. At the same time, lines 160, which are the E leads of the Receive One Circuit 32 of the multiplexer, are disconnected from lines 280. Furthermore, lines 214 which are the E leads of the Receive Two Circuit 34 are connected to lines 280 which serve as the E leads associated with voice one of the PBX.

The routing of the dialing pulses occurs as follows: Dialing pulses from the A1 phone pass into PBXA and through line 276 to the D. C. Signal Routing Circuit 38. The dialing pulses thus appear on lines 64 and 108 as outputs of the circuit 38. The dialing pulses appearing on line 64 result in dialing signals appearing on line 74, which line is the output of the Transmit One Circuit 28, in a manner identical to the operation which occurs during the duplex mode of operation. However, the dialing signals appearing on line 74 are precluded from passing to the linear combiner via the now opened pair of contacts in relay 222 of the associated Interface and Control Circuit 36. The dialing signals appearing on line 108 pass into the input interface and threshold circuit 86 of the Transmit Two Circuit 30 of the MXRA and result in the production of dialing pulses on line 116 in the manner identical to that which occurs during the duplex mode of operation. The dialing signals appearing on line 116 are bursts of 2,600 Hz sine waves, and are provided into the linear combiner directly via line 116. These dialing pulses pass through the linear combiner, through line 258, and the 600 ohm interface circuit 234 to lines 22B which serve as the input to the MXRB. The dialing pulses enter the MXRB via the 600 ohm interface circuit 216 of the associated Interface and Control Circuit 36 and exit on line 248 thereof. The dialing pulses appearing on line 248 are attenuated by variable amplifier 218 and are provided on line 186. Line 186 is isolated from line 138 via an open pair of contacts in relay 224 of the associated Interface and Control Circuit, but is directly connected to the input of the 2,600 Hz bandpass filter 172 of the Receive Two Circuit 34 of the MXRB. The 2,600 Hz bandpass filter 172, the 2,600 Hz tone detector 174, the pulse width discriminator 176, the dial pulse normalizer 178, the on/off hook detector 180, the gate 182, and the relay driver and relay 184 operate in an identical manner to that previously described with regard to the duplex mode of operation, such that the E leads 214 are energized by the normalized dialing pulses. The dialing signals appearing on lines 214 are coupled via the closed contacts of the D. C. Signal Routing Circuit 38 of the MXRB to lines 280 which are the voice one E lead inputs to the PBXB. The dialing information carried on lines 280 results in PBXB energizing the E leads to the telephone B2 in accordance with the dialing pulses received. The energization of the E leads on telephone B2 result in the telephone's ringing. When the hand set of the telephone B2 is removed from the cradle, full voice communication is established between telephones A1 and B2.

The routing of the voice signals is identical to that previously discussed with the full voice communication between telephones A1 and B1.

In FIG. 5 there is shown a portion of the Transmit One Circuit 28. As can be seen therein, the 600 ohm interface circuit 40 includes a capacitor 274 connected in series with the primary of a transformer 276 between input lines 54. The secondary of transformer 276 is connected across resistor 278. One side of resistor 278 is connected to ground and the other side is connected to line 56.

The capacitor 274 serves as a DC blocking capacitor and the transformer 276 serves as an impedence matching device with resistor 278 serving as the burden for the transformer.

The 1,100 Hz low-pass filter 42 comprises a resistor 280 connected via one of its ends to input line 58 and via the other of its ends to one side of a capacitor 282, to one side of a resistor 284 and to the negative or inverting input of an operational amplifier 286. The other side of capacitor 282 and resistor 284 are connected to the output of the operational amplifier. The positive or non-inverting input of the operational amplifier 286 is connected to ground. The output of operational amplifier 286 is connected to one side of capacitor 288 and to one side of resistor 290. The other side of resistor 290 is connected to one side of a resistor 292 and to one side of a capacitor 294. The other side of capacitor 294 is connected to ground and is connected to one side of capacitor 296. The other side of capacitor 296 is connected to the other side of resistor 292 and to one side of resistor 298. The other side of resistor 298 is connected to the other side of resistor 288 and to one side of resistor 300. One side of a capacitor 302 is connected to ground and to the common point of capacitors 296 and 298 and the non-inverting input of an operational amplifier 304. The inverting input of amplifier 304 is connected to one side of resistor 306 and to one side of resistor 308. The other side of resistor 306 is connected to the common point of capacitors 294, 296 and 302 and the other side of resistor 308 is connected to the output of the operational amplifier 304, the other side of resistor 300, one side of a capacitor 310 and one side of a resistor 312. The other side of resistor 312 is connected to one side of a capacitor 314 and to one side of a resistor 316. The other side of capacitor 314 is connected to ground. The other side of resistor 316 is connected to the common point of capacitors 318, 320 and 322 and the non-inverting input terminal of operational amplifier 324. The other side of capacitor 318 is connected to the other side of capacitor 310. The other side of capacitors 320 and 322 are connected to one another, to one side of a resistor 326 and to ground. The other side of resistor 326 is connected to one side of a resistor 328 and to the inverting input of operational amplifier 324. The other side of resistor 328 is connected to the output of the operational amplifier and to one side of resistor 330. The other side of resistor 330 is connected to the common point of capacitors 318 and 310. The output of the operational amplifier is connected to one side of a resistor 332. The other side of the resistor 332 is connected to one side of resistor 334, to one side of resistor 336 and to one side of capacitor 338. The other side of resistor 334 is connected to ground. The other side of capacitor 338 is connected to one side of capacitor 340. The other side of resistor 336 is connected to one side of capacitor 342 and to one side of resistor 344. The other side of capacitor 342 is connected to ground and the other side of resistor 344 is connected to the other side of capacitor 340 and one side of capacitor 346. The other side of capacitor 346 is connected to ground. One side of a resistor 348 is connected to the common point of capacitors 338 and 340. One side of a capacitor 350 is connected to the common point of capacitors 340 and 346 and the non-inverting input of an operational amplifier 352 and the other side of capacitor 350 is connected to ground. One side of a resistor 354 is connected between ground and the inverting input of operational amplifier 352. A resistor 356 is connected between the inverting input of operational amplifier 352 and its output. A trimming resistor 358 is connected in shunt with resistor 354 and the second trimming resistor 360 is connected in shunt with resistor 356.

The 1,100 Hz low-pass filter as described immediately above, is a seventh order Cauer filter. The filter includes four stages. The first stage being associated with operational amplifier 286, the second stage being associated with operational amplifier 304, the third stage being associated with operational amplifier 324 and the fourth stage being associated with operational amplifier 352. The first stage provides the real pole of the filter's characteristic, whereas each of the remaining three stages each provides a pole-zero pair.

The output terminal of operational amplifier 352 is the output of the 1,100 Hz low-pass filter 42 and is connected to the input to the variable attenuator 44. As can be seen, variable attenuator 44 includes the series connection of a resistor 362 and a variable potentiometer 364. The wiper of the potentiometer 364 is connected to line 28. The potentiometer provides adjustable attenuation for the signals exiting the 1,100 Hz low-pass filter 42. The low-pass filter 42 acts not only to limit the speech band to the band between 300 and 1,100 Hz but it also acts to shape the amplitude characteristics to enhance quality of voice transmission. There is an interrelationship between the pass band and the shape which when optimized enhances quality. The low-pass filter 42 acts to shape the response by gradually increasing the response from a low point at 300 Hz to a high point at 1,100 Hz. This shaping is performed not only by low-pass filter 42 but also low-pass filter 78 which is referred to hereinafter and which is identical to low-pass filter 42.

The input interface and threshold circuit 46 is connected as a Schmitt Trigger to eliminate the effects of relay contact bounce in the telephone system. As previously noted, when line 64 is at ground potential, thereby indicating that an associated phone is on hook, the output of circuit 46 as provided on line 66 is high, whereas when line 68 goes to minus 48 volts, thereby indicating an off hook condition, line 66 is low.

As can be seen, circuit 46 includes a resistor 366 which is connected via one of its sides to line 64. The other side of resistor 366 is connected to one side of capacitor 368, one side of resistor 370 and the base of a transistor 372. The other side of capacitor 368 and of resistor 370 are connected together to ground. The collector of transistor 372 is connected to one side of resistor 374 and to one side of resistor 376. The emitter of transistor 372 is connected to one side of a resistor 378 whose other side is connected to ground. The other side of resistor 376 is connected to one side of a resistor 380 and to the base of a transistor 382. The other side of resistor 380 is connected to ground. The emitter of transistor 372 is connected to the emitter of transistor 382. The collector of transistor 382 is connected to one side of a resistor 384 and to one side of a resistor 386. The other side of the resistor 386 is connected to the other side of resistor 374 and to a minus 15 volt bias terminal. The other side of resistor 386 is connected to one side of a resistor 388, the cathode of a diode 390 and line 66. The other side of resistor 388 is connected to a plus 15 volt bias terminal. The anode of diode 390 is connected to ground.

The output of the threshold detector circuit 46 is connected via line 66 to the enable input terminal of gate circuit 48.

As can be seen in FIG. 5, gate circuit 48 comprises a NAND gate 392 having one input thereof connected to line 66 and having the other input thereof connected to line 68. Line 68 provides 1,300 Hz square waves to gate 392 from the Interface and Control Circuit 36. Accordingly, it should be appreciated that when a telephone associated with the MXRA is on hook, 1,300 Hz square waves are enabled to pass from line 68 to line 70, whereas when the phone is off hook, the square waves are precluded from passing to line 70 by the action of gate 392.

Line 70 serves as the input to the 1,300 Hz bandpass filter 50. This circuit is arranged to convert 1,300 Hz square wave signals appearing on line 70 into 1,300 Hz sine waves by filtering out the odd ordered harmonics of the square wave. As can be seen, the 1,300 Hz bandpass filter 50 comprises a resistor 394 connected by one of its sides to line 70 and to one side of a resistor 396. The other side of resistor 394 is connected to a plus 5 volt bias terminal. The other side of resistor 396 is connected to one side of a tuned circuit made up of a capacitor 398 and an inductor 400. The tuned circuit is tuned to 1,300 Hz. The other side of the tuned circuit is connected to ground. The common point of resistor 396 and the tuned circuit is connected to the non-inverting input of an operational amplifier 402. The inverting input of the operational amplifier 402 is connected to its output at line 72. The bandpass filter is of conventional construction. The amplifier provided at the output of the tuned circuit provides a high output impedence to thereby isolate the filter from the connected circuitry. The output of bandpass filter 50 is provided at line 72. Line 72 serves as the input to the variable attenuator 52.

As can be seen, the variable attenuator 52 includes a first resistor 404 connected by one of its sides to line 72 and by its other side to one side of potentiometer 406. The other side of the potentiometer 406 is connected to ground. The wiper of the potentiometer is connected to line 74, which line serves as the output of the variable attenuator.

The variable attenuator serves to attenuate the signal exiting the bandpass filter.

In FIGS. 6A there is shown a portion of the Transmit Two Circuit 30. As can be seen therein, the Transmit Two Circuit includes a 600 ohm interface circuit 76 which is of identical construction to the previously described interface circuit 40, and an 1,100 Hz low-pass filter 78 which is of identical construction to the previously described 1,100 Hz low-pass filter circuit 42. Accordingly, the details of circuits 76 and 78 will not be repeated.

The output of the 1,100 Hz low-pass filter 78 is provided at line 98. Line 98 serves as the input to balanced modulator 80. The function of the balanced modulator 80 is to modulate the input signal appearing on line 98 to provide two side band signals, one upper side band and one lower side band.

As can be seen in FIG. 6A, the balanced modulator includes a first capacitor 408 connected via one of its sides to line 98 and via its other side to one side of capacitor 410. The other side of capacitor 410 is connected to one side of resistor 412 and to a non-inverting input of an operational amplifier 414. The output of the operational amplifier 414 is connected to the inverting input thereof and to one side of a resistor 416, the other side of resistor 416 is connected to one side of a potentiometer 418. The other side of the potentiometer 418 is connected to one side of a resistor 420, whose other side is connected to the other side of resistor 412 and to ground. The wiper of the potentiometer 418 is connected to the non-inverting input of an operational amplifier 422. The output of the operational amplifier is connected back to its inverting input and is connected to one side of a resistor 424. The other side of resistor 424 is connected to the inverting input of an operational amplifier 426 and to one side of a resistor 428. The other side of resistor 428 is connected to the output of the operational amplifier 426 and is connected to line 100. A transistor 430 is provided with its base connected to ground and to one side of a resistor 432. The other side of the resistor 432 is connected to the emitter of the transistor 430. The collector of transistor 430 is connected to the anode of a diode 434, whose cathode is connected to the anode of diode 436. The cathode of diode 436 is connected to the base of a transistor 438. The collector of transistor 438 is connected to the cathode of a diode 440, whose anode is connected to the collector of transistor 430. The base of transistor 438 is connected to one side of a resistor 442, whose other side is connected to the emitter thereof and to a minus 15 volt bias terminal. The collector of transistor 438 is connected to one side of a resistor 444, a resistor 446 and a capacitor 448. The other side of resistor 446 is connected to the anode of a diode 450 whose cathode is connected to the other side of capacitor 448 and to the gate electrode of a junction field effect transistor (JFET). The other side of resistor 444 is connected to a plus 15 volt bias terminal. The drain electrode of the JFET is connected to one side of a resistor 454, the other side of which being connected to one side of a resistor 456 and to the non-inverting input of operational amplifier 426. The other side of resistor 456 is connected to ground. The source electrode of the JFET 452 is connected to the output of operational amplifier 414. A resistor 458 is connected between line 99 and the emitter of transistor 430. Line 99 provides a 2,600 Hz square wave to the balanced modulator from the Interface and Control Circuit 36. The amplitude of the 2,600 Hz square wave is 5 volts.

The transistors 430 and 438 and associated circuitry within the balanced modulator 80 amplify the signals provided on line 99 and to provide same to the gate electrode of the JFET 452. The capacitor 448 serves to deplete the charge on the gate electrode of the JFET and the diode 450 precludes the gate electrode from going negative. The JFET, in response to the 2,600 Hz signals at its gate, chops the signal appearing at the output of amplifier 414 at the 2,600 Hz repetition rate.

The input signal to the balanced modulator as provided on line 98 passes through DC blocking capacitors 408 and 410 to the non-inverting input terminal of the operational amplifier 414. This amplifier serves as the isolating follower and has a high input impedence and a low output impedence. The output of the operational amplifier 414 is provided directly to the source electrode of the JFET 452 and is attenuated via resistor 416 and the potentiometer 418 and provided to the non-inverting input of operational amplifier 422. Amplifier 422 amplifies the signal and provides it, via resistor 424, to the inverting input terminal of the operational amplifier 426. Amplifier 426 serves as a summing circuit. The operational amplifier 426, acting as a summing circuit, subtracts the output of the 1,100 Hz low-pass filter 78 output, as provided via resistor 424, from the signal which results from the chopping of the output signal of the operational amplifier 414 by the JFET 452. As will be appreciated by those skilled in the art, this action has the effect of modulating the input signal appearing on line 98 into a pair of side band output signals. The output signals are provided on line 100 and have a bandwidth of from 1,500 Hz to 2,600 Hz and from 2,600 Hz to 3,700 Hz.

FIG. 6B shows the remaining portion of the Transmit Two Circuit 30. As can be seen, line 102 serves as an input to the 2,400 Hz low-pass filter circuit 82. Line 102 is connected to one side of a resistor 460. The other side of resistor 460 is connected to the inverting input terminal of an operational amplifier 462, to one side of capacitor 464 and to one side of resistor 466. The other side of resistor 466 and capacitor 464 are connected to the output of the operational amplifier and to one side of capacitor 468 and resistor 470. The other side of capacitor 468 is connected to one side of capacitor 472 and one side of resistor 474. The other side of resistor 470 is connected to one side of capacitor 476 and one side of resistor 478. The other side of capacitor 476 is connected to ground. The other side of resistor 478 is connected to one side of capacitor 480, to one side of capacitor 482 and to the non-inverting input terminal of operational amplifier 484. The other side of capacitor 480 and capacitor 482 are connected to ground and to one side of resistor 486. The other side of resistor 486 is connected to the inverting input of operational amplifier 484 and to one side of resistor 488. The other side of resistor 488 is connected to the output of operational amplifier 484, to one side of resistor 500 and to one side of capacitor 502. The other side of capacitor 502 is connected to one side of a capacitor 504 and to one side of resistor 506. The other side of resistor 500 is connected to one side of a capacitor 508, to one side of capacitor 510 and one side of resistor 512. The other side of capacitors 508 and 510 are connected to ground. The other side of resistor 512 is connected to one side of capacitor 514, to one side of capacitor 516 and the non-inverting input of operational amplifier 518. The other sides of capacitors 514 and 516 are connected together to ground and to one side of resistor 520. The other side of resistor 520 is connected to the non-inverting input of operational amplifier 518 and to one side of resistor 522. The other side of resistor 522 is connected to the output of the operational amplifier 518, to the other side of resistor 506 and to one side of resistor 524. The other side of resistor 524 is connected to one side of a resistor 526, to one side of a resistor 528 and to one side of a capacitor 530. The other side of capacitor 530 is connected to one side of a resistor 532 and to one side of a capacitor 534. The other side of resistor 528 is connected to one side of capacitor 536, to one side of capacitor 538 and to one side of resistor 540. The other sides of capacitors 536 and 538 are connected together to ground. The other side of resistor 540 is connected to the other side of capacitor 534, to one side of capacitors 542 and 544 and to the non-inverting input terminal of operational amplifier 546. The other side of capacitors 542 and 544 are connected together to one side of resistor 548. The other side of resistor 548 is connected to the inverting input terminal of the operational amplifier 546 and to one side of resistor 550. The other side of resistor 550 is connected to the output of the operational amplifier 546, to the other side of resistor 532, to one side of a resistor 552 and to one side of a capacitor 554. The other side of capacitor 554 is connected to one side of capacitor 556 and to one side of resistor 558. The other side of resistor 552 is connected to one side of capacitor 560, to one side of capacitor 562 and to one side of resistor 564. The other side of capacitors 560 and 562 are connected together to ground. The other side of resistor 564 is connected to the other side of capacitor 556, to one side of capacitors 566 and 568 and to the non-inverting input terminal of operational amplifier 570. The other side of capacitors 566 and 568 are connected together to ground and to one side of resistor 572. The other side of resistor 572 is connected to one side of resistor 574 and to the inverting input terminal of operational amplifier 570. The other side of resistor 574 is connected to the output of the operational amplifier 570, to the other side of resistor 558 and to line 104. A first trimming resistor 576 is connected in shunt with resistor 572 and a second trimming resistor 578 is connected in shunt with resistor 574.

The 2,400 Hz low-pass filter 82 is a ninth order Cauer filter. The filter is made up of five stages. The operational amplifier 462 and associated circuitry form the first stage of the filter, the operational amplifier 484 and associated circuitry form the second stage of the filter, the operational amplifier 518 and associated circuitry form the third stage of the filter, the operational amplifier 546 and associated circuitry form the fourth stage of the filter and the operational amplifier 570 and associated circuitry form the fifth stage of the filter. The first stage of the filter provides the real pole of the filters' characteristic and the remaining four stages each provide a pole-zero pair.

The 2,400 Hz low-pass filter is operative for removing the upper side band as provided by balanced modulator 80 and for limiting the lower side band to 2,400 Hz. Accordingly, the output of the low-pass filter circuit 82 as provided on line 104 contains signals from 1,500 Hz to 2,400 Hz. The signals appearing on line 104 are provided to the variable attenuator 84 which, as can be seen in FIG. 6B, is a potentiometer whose wiper is connected to line 106. The variable attenuator 84 serves to attenuate the signal appearing on line 104 and to provide same to line 106.

The Transmit Two Circuit 30 also includes an input interface and threshold circuit 86, which is of identical construction as the previously described input interface and threshold circuit 46 of the Transmit One Circuit 28 and a gate 88 which is of identical construction as the previously described gate 48 of the Transmit One. Accordingly, the details of circuits 86 and 88 will not be repeated. The output of gate 88 is a train of 2600 Hz square waves when the gate 88 is enabled as a result of an on hook condition and is a ground signal when the gate is disabled as a result of an off hook condition. The output of gate 88 is provided on line 112 which serves as an input to a 2,600 Hz bandpass filter circuit 90.

The 2,600 Hz bandpass filter circuit 90 is operative to convert the 2,600 Hz square wave input into a 2,600 Hz sine wave output. The filter does this by filtering out odd ordered harmonics of the square wave input. Circuit 90 is of similar construction to the 1,300 Hz bandpass filter 50 of the Transmit One Circuit 28. For example, the 2,600 Hz bandpass filter circuit 90 comprises a first resistor 580 which is connected by one of its sides to input line 112 and is connected by its other side to resistor 582. The other side of resistor 580 is connected to a plus 5 volts bias terminal. The other side of resistor 582 is connected to one side of a tuned circuit comprising a capacitor 584 and an inductor 586 and to the non-inverting input of an operational amplifier 588. The other side of the tuned circuit is connected to ground. The tuned circuit is tuned to 2,600 Hz. The output of operational amplifier 588 is connected to its inverting input.

The output of the 2,600 Hz bandpass filter 90 is provided on line 114, which is connected to one side of a variable attenuator 92. As can be seen in FIG. 6B, attenuator 92 comprises a resistor 590 connected in series with a potentiometer 592. The wiper of the potentiometer is connected to line 116.

FIG. 7A shows a portion of the Receive One Circuit 32. As can be seen therein, line 138 is provided as an input into 1,100 Hz low-pass filter circuit 118. The output of the 1,100 Hz low-pass filter is provided on line 140. The 1,100 Hz low-pass filter circuit 118 is of identical construction to the 1,100 Hz low-pass filter circuit 78 in the Transmit Two Circuit 30 and the 1,100 Hz low-pass filter 42 in the Transmit One Circuit 28. Accordingly, the details of the 1,100 Hz low-pass filter 118 will not be repeated.

Line 142 serves as an input to the Receive One Circuit 32 and more particularly to the variable amplifier 120 thereof. The amplifier 120 serves to amplify the narrow band voice signal provided to it via line 142. As can be seen, variable amplifier 120 comprises a potentiometer 594 having one side connected to line 142 and the other side connected to ground. The wiper of the potentiometer is connected to the non-inverting input of an operational amplifier 596. The inverting input of operational amplifier 596 is connected to one side of a resistors 598 and 600. The other side of resistor 598 is connected to ground. The other side of resistor 600 is connected to the output of operational amplifier 596 and line 144. Line 144 serves as the input to a 600 ohm interface circuit 122.

As can be seen, the 600 ohm interface includes a resistor 602 which is connected via one of its sides to input line 144. The other side of the resistor 602 is connected to one side of a primary of a transformer 604. The other side of the primary of the transformer is connected to ground. The secondary of transformer 604 is connected to lines 146 which serve as the voice one output lines.

FIG. 7B shows the remaining portion of the Receive One Circuit 32. As can be seen, line 138 is connected to the input of the 1,300 Hz bandpass filter 124. The bandpass filter 124 comprises an operational amplifier 606 having its non-inverting input connected to line 138 and having its inverting input connected to its output. When arranged thusly, the operational amplifier serves as a high impedence follower.

The output of the operational amplifier 606 is connected to one side of resistor 608. The other side of resistor 608 is connected to one side of a tuned circuit made up of a capacitor 610 and an inductor 612. The other side of the tuned circuit is connected to ground. The tuned circuit is tuned to 1,300 Hz. The common point of resistor 608 and the tuned circuit is connected to the non-inverting input of an operational amplifier 614. The inverting input of amplifier 614 is connected to one side of a resistor 616 and to one side of a resistor 618. The other side of resistor 616 is connected to ground and the other side of resistor 618 is connected to the output of operational amplifier 614 and to line 148.

The 1,300 Hz bandpass filter is operative for removing the odd harmonics of the 1,300 Hz square waves which are provided on line 138 and to provide a 1,300 Hz sine wave output on line 148.

Line 148 serves as the input to 1,300 Hz tone detector 126. Circuit 126 is arranged to detect the presence of a 1,300 Hz sine wave or tone and to provide a logic low signal on output line 150 when such a tone is present and to provide a logic high signal when the 1,300 Hz tone is absent. The tone detector comprises a capacitor 620 having one side connected to input line 148 and having the other side connected to pin 3 of an integrated circuit tone detector such as Signetics Model No. NE567V. The pin 5 of the integrated circuit 622 is connected to one side of a resistor 624, the other side of which being connected to the wiper of a potentiometer 626. One side of the potentiometer 626 is connected to pin 6 of the amplifier 622 and to one side of a capacitor 628. The other side of capacitor 628 is connected to ground, to pin 7 and to one side of capacitors 630 and 632. The other side of capacitor 630 is connected to the pin 2 of the integrated circuit. The other side of capacitor 632 is connected to the pin 1 of the integrated circuit and to one side of a resistor 634. The other side of resistor 634 is connected to the pin 4, to one side of resistor 636 and to a plus 5 volt bias terminal. The other side of resistor 636 is connected to pin 8 and to line 150.

The resistors and capacitors connected to the integrated circuit 622 serve to establish the parameters and the operating frequency of the tone detector.

The logic output signal appearing on line 150 may include spurious signals or eroneous transitions thereon.

The on/off hook detector 132 is provided to determine if a true on or off hook hook condition exists or if a transition appearing on line 150 is an error. More particularly, the on/off hook detector 132 prevents extraneous transitions or errors and dialing pulses, from passing through the gate during an on hook condition and prevents errors or extraneous transitions from passing through the gate during the off hook condition. This action is accomplished by providing a 200 millisecond delay after the detection of an off hook condition before circuit 132 enables gate 134 and providing a 150 millisecond delay after the detection of an on hook condition before circuit 132 diables gate 134.

The details of the on/off hook detector 132 are shown in FIG. 7B. As can be seen therein, line 150 serves as the input to the on/off hook detector 132. The on/off hook detector 132 includes an inverter 638 having its input connected to line 150. The output is connected to one side of a resistor 640. The other side of resistor 640 is connected to one side of a capacitor 642. The other side of capacitor 642 is connected to ground. Resistor 640 and capacitor 642 act as an integrating circuit. A diode 644 is connected in shunt with resistor 640 with its cathode being connected to the common point of resistor 640 and capacitor 642. The output of inverter 638 is connected to one side of resistor 646. The other side of resistor 646 is connected to one side of the capacitor 648. The other side of capacitor 648 is connected to ground. A diode 650 is connected in shunt with resistor 646 with its anode being connected to the common point of resistor 646 and capacitor 648. Resistor 646 and capacitor 648 form another integrating circuit.

The common point of resistor 640 and capacitor 642 is connected to pin 3 of an integrated circuit dual operational amplifier 652. This device is preferably a Signetics Model No. N5558V. The common point of resistor 646 and capacitor 648 is connected to pin 5 of the integrated circuit 652. Pin 8 of the integrated circuit is connected to a plus 15 volt bias terminal and pin 4 is connected to a minus 15 volt bias terminal. Pins 1 and 2 of the intregrated circuit 652 are connected together to the input of an inverter 654 and pins 6 and 7 of the integrated circuit are connected together to the input of inverter 656. The integrated circuit 652 is arranged such that the voltage appearing on pins 1 and 2, which pins serve as outputs, follows the voltage appearing on input pin 3 and that the voltage appearing on pins 6 and 7, which pins serve as outputs, follows the voltage appearing on pin 5.

The output of inverter 654 is provided into a two input NAND gate 658 and to one input of a NAND gate 660. The output of NAND gate 658 is connected to one side of resistor 662. The other side of resistor 662 is connected to the other input to NAND gate 660 and to one side of the capacitor 664. The other side of capacitor 664 is connected to ground.

The output of inverter 656 is connected to both inputs of a two input NAND gate 666 and to one side of a resistor 670. The other side of resistor 670 is connected to one side of a capacitor 672 and to one side of a two input NAND gate 668. The other side of capacitor 672 is connnected to ground. The output of NAND gate 666 is connected to the other input to NAND gate 668.

The output of NAND gate 668 is provided to one input of NAND gate 676. The output of NAND gate 676 is connected to the other input of NAND gate 674. The output of NAND gate 668 is provided to the other input of NAND gate 676. The output of NAND gate 674 is connected to line 152.

NAND gate 658 and 660 establish a puls forming network which provides a very short duration pulse 200 microseconds after an off hook condition occurs, i.e. a positive going signal appearing on line 150. In a similar manner, NAND gate 666 and 668 establish a pulse forming network which provides a very short duration pulse 200 microseconds after an on hook condition occurs, i.e. a negative going signal appearing on line 150.

NAND gates 674 and 676 are interconnected in the form of a latch. The latch remembers whether an on or an off hook condition last existed. One of the latch's inputs is provided by NAND gate 660. A pulse appearing at that input to the latch is an indication that a valid off hook condition arose. The other input to the latch is provided via NAND gate 668. A pulse appearing on that input to the latch indicates that a valid on hook condition arose.

Operation of the on/off hook detector 132 in response to an off hook condition is as follows: Prior to the off hook condition arising, a low signal appears on output line 152 and capacitors 642 and 648 are charged up by the high signal appearing at the output of inverter 638. Upon the off hook signal arising, i.e. a high signal on line 150, the output of inverter 638 goes low, whereupon capacitor 648 discharges immediately via the forward biased diode 650, whereas capacitor 642 discharges slowly, via resistor 640. The output voltages appearing on output pins 2 and 7 follow the voltages appearing on input pins 3 and 5, respectively. Thus, the voltage appearing at the input of inverter 656 is low, whereas the voltage appearing at the input of inverter 654 is still high but will be going down slowly. When the voltage at the input to inverter 654 goes down sufficiently, which occurs after 200 milliseconds, the output of inverter 654 goes high, whereupon the output of NAND gate 658 goes low and one input of NAND gate 660 goes high. The capacitor 664 coupled to the output of NAND gate 658 begins discharging when the output of the NAND gate goes low. Accordingly, 200 milliseconds after the occurrence of a signal indicating an off hook condition, the NAND gate 660 has a high signal on one input terminal, i.e. the input from inverter 654, and a high signal is maintained for a short time on the other input of NAND gate 660 by the capacitor 664. The momentarily coincident high signals appearing at the inputs to NAND gate 660 result in the provision of a negative going pulse at its output. The pulse has the effect of causing the latch to shift to the state wherein the output of gate 674 as provided on line 152 is high. The high signal appearing on line 152 enables gate 134 to conduct dial pulses therethrough.

The on/off hook detector 132 operates in an analogous manner to provide a low signal at output line 152, 150 milliseconds after the occurrence of a valid on hook signal, i.e. a low signal on line 150.

The on/off hook detector 132 is also operative to preclude positive going input signals of less than 200 milliseconds duration during an on hook condition from resulting in the enabling of gate 134 and for preventing negative going signals of less than 150 millisecond duration during an off hook condition from disabling the gate.

Dialing pulses are of approximately 50 milliseconds duration. Accordingly, the on/off hook detector does not disable gate 134 in response to the receipt of dialing pulses on input line 150 during the off hook condition.

The pulse width discriminator circuit 128 is provided to discriminate between dialing pulses which, as noted, are on the order of 50 milliseconds in duration, from errors or transitions which may appear on line 150 and which are of less than 15 milliseconds duration. As can be seen in FIG. 7B, the pulse width discriminator includes an inverter 678 whose input is connected to line 150 whose output is connected to one side of a resistor 680. The other side of resistor 680 is connected to one side of capacitor 682. The other side of capacitor 682 is connected to ground. A diode 684 is connected in shunt with resistor 680 with its anode connected to the common junction of resistor 680 and capacitor 682. The output of inverter 678 is also connected to one side of a resistor 686. The other side of resistor 686 is connected to one side of capacitor 688. The other side of capacitor 688 is connected to ground. A diode 690 is connected in shunt with resistor 686 with its cathode connected to the common junction of resistor 686 and capacitor 688.

Resistor 680 and capacitor 682 form a first integrating circuit and resistor 686 and capacitor 688 form a second integrating circuit.

The common point of resistor 680 and 682 is connected to pin 3 of an integrated circuit 692 which is the same as the integrated circuit dual operational amplifier 652. The common point of resistor 686 and capacitor 688 is connected to pin 5 of the integrated circuit 692. Pin 8 of the integrated circuit 692 is connected to a plus 15 volt bias terminal and pin 4 thereof is connected to a minus 15 volt bias terminal. Pins 1 and 2 of integrated circuit 692 are connected together and to one input to a two input EXCLUSIVE NOR gate 694 and pins 6 and 7 of the integrated circuit are connected together to the other input of the gate. The output of the EXCLUSIVE NOR gate is provided as an input to inverter 696 and to one side of resistor 698. The other side of resistor 698 is connected to one side of a capacitor 700. The other side of the capacitor 700 is connected to ground. Resistor 698 and capacitor 700 form an integrating circuit. The common point of resistor 698 and capacitor 700 is provided to one input of a NAND gate 702. The other input of NAND gate 702 is connected to the output of inverter 696. The output of NAND gate 702 is provided as an input to inverter 704 whose output is provided to the clock input of a JK flip-flop 706. The J input to flip-flop 706 is connected to the input of inverter 678, i.e. line 150, and the K input to flip-flop 706 is connected to the output of the inverter 678. The output of flip-flop 706 is connected to line 154.

The output pins 2 and 7 of the integrated circuit 692 respond to input signals appearing on line 150 in an analagous manner that the output pins 2 and 7 of integrated circuit 652 respond to input signals appearing on line 150, save for the different time constants involved.

The EXCLUSIVE OR gate 694 provides an output pulse at the occurrence of each transition of the signal appearing on the input line 150. The pulse provided by EXCLUSIVE NOR gate 694 is established by the integrating circuits connected to the inputs of the integrated circuit 692 and is of approximately 15 milliseconds duration. The inverter 696 and NAND gate 702, in conjunction with the connected integrating circuit, provides a pulse at the termination of the pulse provided by EXCLUSIVE OR gate 694. The pulse provided by NAND gate 702 is inverted by inverter 704 and provided as the clock input to the JK flip-flop 706.

Since the J and K input terminals to the flip-flop are connected across inverter 678, the signal which appears on the output of the flip-flop is the signal which appears on line 150 at the instant that the flip-flop is clocked. Any pulse on line 150 which is less than 15 milliseconds duration will not effect a change in the state of the flip-flop, 706, since the input thereto will return to its previous state before the clock signal, which is generated as a result of the occurrence of the less than 15 millisecond pulse, clocks the flip-flop. Accordingly, the output signal of the pulse width discriminator circuit 128 is substantially the same as the input signal but is delayed 15 milliseconds.

The pulse width discriminator also serves to clean up any spurious signals appearing on the leading or trailing edges of the dial pulses appearing on lines 150.

The output of the pulse width discriminator is provided on line 154. Line 154 serves as the input to the dial pulse normalizer circuit 130. The dial pulse normalizer ensures that the dial pulses have the proper on/off ratio as required by the telephone company, i.e. 40 milliseconds on and 60 milliseconds off, irrespective of whether or not the pulses from the pulse width discriminator are clean square waves.

The dial pulse normalizer is basically a one shot or monostable multi-vibrator which monitors the output of the pulse width discriminator circuit 130 and triggers on the negative going edge of each output pulse appearing therefrom, to provide a low signal for 60 milliseconds after each negative going edge. Accordingly, the output pulses of the dial pulse normalizer have a 40 millisecond ON interval and a 60 millisecond OFF interval.

As can be seen, the dial pulse normalizer includes a capacitor 708 having one side connected to line 154 and having another side connected to one side of a resistor 710, one side of a resistor 712 and the pin 2 of an integrated circuit 714, which is a Signetics Model No. NE555V. The other side of resistor 710 is connected to the common point of pins 4 and 8 of the integrated circuit 714. The other side of resistor 712 is connected to ground and to one side of the capacitor 716, to pin 1 of the integrated circuit and to one side of a capacitor 718. The other side of capacitor 716 is connected to pin 5 of the integrated circuit 714 and the other side of capacitor 718 is connected to pins 6 and 7 thereof and to one side of a resistor 720. The other side of resistor 720 is connected to one side of resistor 722, to one input of an EXCLUSIVE OR gate 724, to pins 4 and 8 of the integrated circuit 714 and to a plus 5 volt bias terminal. The other side of resistor 722 is connected to pin 3 of the integrated circuit 714 and to the other input to the EXCLUSIVE OR gate 724.

The EXCLUSIVE OR gate 724 serves to invert the dial pulses which have been normalized by the integrated circuit and associated circuitry and to provide the inverted normalized dial pulses on line 156.

Line 156 serves as one input to gate 134, the other input of which being connected to line 152. The output of gate 134 is connected to line 158. Line 158 serves as the input to the relay and relay driver circuit 136.

As can be seen in FIG. 7B, the relay and relay driver circuit 136 includes a resistor 726 having one side thereof connected to line 158 and having the other side thereof connected to the base of a transistor 728. The emitter of the transistor 728 is connected to ground and the collector is connected to one side of an actuating coil of a relay 732. The other side of the coil is connected to a plus 15 volt bias terminal. A diode 730 is connected across the relay actuating coil with its anode connected to the collector of transistor 728.

Relay 732 is operative when energized for closing a pair of contacts in the relay thereby energizing the leads 160. Operation of the relay and relay driver is as follows: Upon a positive signal appearing on line 158, transistor 724 is rendered conductive, thereby energizing the coil of relay 732 via the 15 volt bias. This action causes the closure of the associated contacts and the energization of lines 160.

In FIG. 8A there is shown the details of a portion of the Receive Two Circuit 34. As can be seen therein, line 186 is provided as an input to the 2,400 Hz low pass filter circuit 162. The output of circuit 162 is connected to line 188. Circuit 162 is of identical construction as the 2,400 Hz low-pass filter 82 of the Transmit Two Circuit 30. Accordingly, the details of circuit 162 will not be repeated.

The Receive Two Circuit 34 also includes balanced modulator 164. One input to the balanced modulator is provided via line 190. The other input to the balanced modulator is provided via line 192. The output of the balanced modulator is connected to line 194. The balanced modulator 164 is of identical construction as the balanced modulator 80 in the Transmit Two Circuit 30. Accordingly, the details of balanced modulator 164 will not be repeated.

Line 194 serves as the input to the 1,100 Hz low-pass filter 166. The output of the 1,100 Hz low-pass filter is connected to line 196. The 1,100 Hz low-pass filter 166 of the Receive Two Circuit 34 is of identical construction as the 1,100 Hz low-pass filters 118, 78 and 42 of the Receive One Circuit 32, Transmit Two Circuit 30 and Transmit One Circuit 28, respectively. Accordingly, the details of the 1,100 Hz low-pass filter 166 will not be repeated.

The variable amplifier 168 is connected to the output of the 1,100 Hz low-pass filter 166 via line 196. The variable amplifier includes a first resistor 734 connected via one of its sides to line 196. The other side of resistor 734 is connected to one side of a potentiometer 736. The other side of potentiometer 736 is connected to ground. The wiper of the potentiometer is connected to the non-inverting input of an operational amplifier 738. One side of a resistor 740 is connected to ground and the other side thereof is connected to the inverting input of amplifier 738 and to one side of resistor 742. The other side of resistor 742 is connected to the output of the amplifier 738 and to line 198.

Line 198 serves as the input to a 600 ohm interface circuit 170. The output of the 600 ohm interface circuit 170 is connected to line 200. The interface circuit 170 is of identical construction to the interface circuit 122 and therefore the details of its construction will not be repeated.

Referring now to FIG. 8B, line 186 serves as the input for the 2,670 Hz notch filter and 2,600 bandpass filter circuit 172. Circuit 172 is operative for filtering odd ordered harmonics on the 2,600 Hz square waves appearing on line 186. Circuit 172 includes a 2,670 Hz band reject or notch filter. This filter is included in order to prevent data signals appearing at a frequency of 2,670 from passing to the tone detector 174 and connected circuitry and causing misoperation.

As can be seen, the narrow bandpass filter portion of circuit 172 comprises an operational amplifier 744 having its non-inverting input connected to line 186. The inverting input is connected to the output of the amplifier and to one side of a resistor 746. The other side of resistor 746 is connected to one side of a capacitor 748, to one side of an inductor 750 and to a non-inverting input of an operational amplifier 754. The other side of capacitor 748 and the other side of inductor 750 are connected together to ground. The capacitor and inductor form a tuned circuit which is tuned to 2,600 Hz. One side of a resistor 752 is connected to ground and the other side of the resistor is connected to the inverting input of the operational amplifier 754 and to one side of a resistor 756. The other side of resistor 756 is connected to the output of the operational amplifier.

The heretofore described circuitry within circuit 172 is a 2,600 Hz bandpass filter which is operative for providing 2,600 Hz sine waves at its output, i.e. the output of amplifier 754.

The output of amplifier 754 is connected to circuitry forming a 2,670 Hz band reject filter. More particularly the output of amplifier 754 is connected to one side of a potentiometer 758 and to one side of a resistor 760. The other side of a resistor 760 is connected to one side of a resistor 762. The other side of a resistor 762 is connected to one side of a capacitor 764 and to the non-inverting input of an operational amplifier 766. One side of a capacitor 768 is connected to the common point of resistor 760 and 762 and the other side of the capacitor 768 is connected to one side of a resistor 770. The other side of resistor 770 is connected to the inverting input of the amplifier 766 and to the output thereof. One side of a capacitor 772 is connected to the wiper of potentiometer 758 and the other side of the capacitor is connected to one side of capacitor 764 and to one side of resistor 774. The other side of the resistor 774 is connected to the common point of capacitor 768, resistors 770 and 776. The other side of resistor 776 is connected to ground and to one side of the resistor 778. The other side of resistor 778 is connected to the wiper of the potentiometer.

As will be appreciated by those skilled in the art, the band reject filter is a conventional twin-T type filter having negative feedback.

The output of the circuit 172 is connected to line 202 which serves as the input to the 2,600 Hz tone detector 174. The tone detector 174 comprises a capacitor 780 having one side connected to line 202 and having the other side connected to pin 3 of integrated circuit tone detector 782. The integrated circuit 782, like tone detector 622 of the Receive One circuit 32 is a Signetics Tone Detector Model NE567V. One side of a resistor 784 is connected to pin 5 of the integrated circuit 782 and the other side thereof is connected to the wiper of a potentiometer 786. One side of a potentiometer 786 is connected to the pin 6 of the integrated circuit 782 and to one side of a capacitor 788. The other side of the capacitor 788 is connected to ground, to pin 7 of the integrated circuit and to one side of capacitors 790 and 792. The other side of capacitor 790 is connected to pin 2 of the integrated circuit. The other side of capacitor 792 is connected to pin 1 of the integrated circuit and to one side of resistor 796. The pin 8 of the integrated circuit is connected to one side of a resistor 798 and to line 204. The other side of resistors 796 and 798 are connected together to pin 4 of the integrated circuit and to a plus 5 volt bias terminal.

The capacitors and resistors connected to the various pins of the integrated circuit 782 establish the frequency and the parameters of the response thereof.

The output of the tone detector, as provided on line 204, is at a low logic level when a 2,600 Hz tone is present and at a high logic level when a 2,600 Hz tone is absent.

Line 204 is connected to the input of the on/off hook detector 180. The output of the on/off hook detector is connected via line 206 to gate 182.

The on/off hook detector 180 of the Receive Two Circuit 34 is of identical construction as the on/off hook detector 132 of the Receive One Circuit 32. Accordingly, the details of the on/off detector 180 will not be repeated.

Line 204 also serves as the input to the pulse width discriminator 176. The output of the pulse width discriminator is provided by line 208.

The pulse with discriminator 176 of the Receive Two circuit 34 is of identical construction as the pulse width discriminator 128 of the Receive One Circuit 32. Accordingly, the details of the pulse discriminator 176 will not be repeated.

The output of the pulse with discriminator serves as the input to the dial pulse normalizer circuit 178. The output of the dial pulse normalizer circuit is connected to line 210.

The dial pulse normalizer circuit 178 of the Receive Two Circuit 34 is of identical construction to the dial pulse normalizer circuit 130 of the Receive One Circuit 32. Accordingly, the details of the dial pulse normalizer 178 will not be repeated.

The gate circuit 182 is a two input NAND gate, one of the inputs being connected to Line 210 and the other input being connected to line 206. The output of the NAND gate is provided on line 212.

Line 212 serves as the input to the relay and relay driver circuit 184. The output of the relay and relay driver circuit is provided on lines 214.

The construction of the relay and relay driver circuit 184 of the Receive Two Circuit 34 is identical to the relay and relay driver circuit 136 of the Receive One Circuit 32. Accordingly, the details of the relay and relay driver circuit 184 will not be repeated.

In FIG. 9 there is shown the construction of the Interface and Control Circuit 36 of the MXRA.

The Interface and Control Circuit 36 includes a 5.2 mega-Hz oscillator 236. The oscillator 236 comprises a crystal 800, one side of which is connected to one input of a two input NOR gate 802 and to one side of resistor 804. The other side of resistor 804 is connected to the output of the NOR gate 802 and to one side of capacitor 806. The other side of capacitor 806 is connected to one input of a two input NOR gate 808 and to one side of resistor 810. The other side of resistor 810 is connected to the output of the NOR gate 808 and to the other side of the crystal 800. The second input for NOR gate 802 is connected to ground as is the second input to NOR gate 808. The output of NOR gate 808 is provided as one input to a two input NOR gate 812. The other input thereto is connected to ground. The output of NOR gate 812 is connected to line 264.

As will be appreciated by those skilled in the art since the two NOR gates 802 and 808 are connected in series with one another, each one inverts the signal of the other thereby providing positive feedback through the crystal. This action results in series resonance at 5.2 mega-Hz within the crystal. The oscillatory signal is provided at the output of NOR gate 808 and into NOR gate 812. The latter NOR gate serves to buffer the signal to prevent the oscillator from being drawn off frequency. The output signal appears on line 264 and comprises 5.2 mega Hz square waves.

The square waves are provided via line 264, into the clock input of a D flip-flop 238 which serves as the divide-by-two circuit 238. As can be seen, the $\overline{Q}$ output of the flip-flop is connected to the D input thereof and the Q output of the flip-flop is connected to output line 266. Accordingly, the signal appearing on line 266 is 2.6 mega-Hz square waves.

Line 266 is the input to a divide-by-one thousand circuit made up of three serially connected divide-by-10 counters 814, 816 and 818. The output of counter 818 is provided into inverter 820. The output of inverter 820 is connected to line 268. The signal thus resulting on line 268 comprises 2,600 Hz square waves. This signal is provided via inverter 241 to line 99 and via inverter 243 to Line 192.

Line 268 also serves as the clock input to a divide-by-two circuit 242 comprising a D flip-flop. As can be seen, the $\overline{Q}$ output of the flip-flop is connected to the D input thereof and the Q output of the flip-flop is connected to line 68. Accordingly, 1,300 Hz square waves appear on line 68. Line 68 also serves as the clock input to another divide-by-two circuit 244. This circuit also comprises a D flip-flop whose $\overline{Q}$ output is connected to its D input and whose Q output is connected to line 270. Accordingly, 650 Hz square waves appear on Line 270. Line 270 serves as the input to a 650 Hz bandpass filter 246.

The bandpass filter 246 comprises a resistor 822 having one side thereof connected to line 270 and having the other side thereof connected to one side of a tuned circuit made up of an inductor 824 and a capacitor 826 and to the non-inverting input of an operational amplifier 828. The other side of the tuned circuit is connected to ground. The tuned circuit is tuned to 650 Hz. The inverting input terminal of the operational amplifier 828 is connected to the output terminal thereof.

Circuit 246 is operative for filtering out odd ordered harmonics of the 650 Hz square wave to provide a 650 Hz sine wave. This signal is provided through a test resistor 830 to line 272, which line serves as a test output line.

The relay 222 of the Interface and Control Circuit 36 is adapted, when in the condition shown in FIG. 9, for connecting line 62 to line 250, for connecting line 64 to line 252, for connecting line 106 to line 256 and for connecting line 254 to ground. Lines 250, 252, 254 and 256 serve as inputs to the linear combiner 232.

The linear combiner 232 comprises resistors 832, 834, 836, 838, 840 and 842, all of which are connected together at a common point to an inverting input of an operational amplifier 844. The non-inverting input of the operational amplifier 844 is connected to ground. The output of the operational amplifier 844 is connected to the pin 3 of an integrated circuit current driver 846, such as National Semiconductor Current Driver Model LH002CN. The output of the current driver 846 is provided on pin 8 and is connected to the other side of resistor 842 and to line 258. Line 258 serves as the output of the linear combiner 232.

As can be seen, the other side of resistor 832 is connected to line 116. Line 116 is adapted to carry dialing information associated with the Transmit Two circuit 30. The other side of resistor 834 is connected to line 250. Line 250 is adapted, during the duplex mode of operation, to carry the narrow band voice signal provided by the Transmit One circuit 28. The other side of resistor 836 is connected to line 252. Line 252 is adapted, during the duplex mode, to carry dialing information from the Transmit One circuit. The other side of resistor 838 is connected to line 256. Line 256 is adapted, during the duplex mode, to carry the narrow band voice signal provided by the Transmit Two circuit 30. The other side of resistor 840 is connected to line 254. Line 254 is connected to ground during the duplex mode of operation but carries the full bandwidth voice signal provided by Transmit Two circuit 30 during the full voice mode of operation.

As should be appreciated, all of the signals appearing on resistors 832, 834, 836, 838 and 840 are added together at the inverting input of operational amplifier 844. The output of the operational amplifier provides a signal which is the inverted sum of the input signals. The summed signal is provided to line driver 846. Line driver 846 increases the current and provides same on line 258. Line 258 is connected to the input of a 600 ohm interface circuit 234.

The 600 ohm interface circuit includes a resistor 848 having one side connected to line 258 and having the other side connected to one side of the primary of a transformer 850. The other side of the primary is connected to ground. The secondary of the transformer is connected to lines 22B which serve as the input to the MXRB.

When relay 220 is in the condition shown in FIG. 9, as is the case during the duplex mode of operation, line 56 is connected to line 58 and line 100 is connected to line 102 via two pairs of closed contacts of the relay.

When relay 224 is in the condition shown in FIG. 9, line 186 is connected to line 138, line 188 is connected to line 100 and line 142 is connected to line 140, via three pairs of normally closed contacts. Furthermore, attenuator 226 is isolated from lines 188 and 142 via a normally opened pair of contacts.

The input to the MXRA, i.e. lines 22A, are connected to 600 ohm interface circuit 216. Circuit 216 includes a transformer 852 whose primary is connected to lines 22A and whose secondary is connected across a burden resistor 854, one side of the secondary being connected to ground. The output of the 600 ohm interface circuit 216 is provided to a variable amplifier circuit 218.

The variable amplifier circuit 218 includes a potentiometer 856, one side of which being connected to one side of the resistor 854 in circuit 216 and the other side of which being connected to the other side of the resistor 854 and to one side of a resistor 858. The other side of resistor 858 is connected to the inverting input of an operational amplifier 860 and to one side of a resistor 862. The other side of resistor 862 is connected to the output of the amplifier 860 and to line 186. The non-inverting input of the amplifier 860 is connected to the wiper of potentiometer 856.

When arranged in the manner shown in FIG. 9, the voice and data signals as well as the on hook, off hook and dialing signals appearing on line 22A are amplified and provided on line 86 through the normally closed contacts of relay 224 to line 138 which is connected to the Receive One circuit 32 of the MXRA.

Line 188 carries the DC to 2,400 Hz output signals of the 2,400 Hz low-pass filter circuit 162 of the Receive Two circuit 34, which signals are enabled to pass, via the closed contacts of relay 224, to line 190. Line 190 is the input to the balanced modulator 164 of the Receive Two circuit 34. Line 140 carries the 1,100 Hz output signals of the Receive One circuit 32, which signals are enabled to pass via normally closed contacts of relay 224 to line 142. Line 142 serves as the input to the variable attenuator 120 of Receive One circuit 32.

Line 56 carries the voice signal provided by the 600 ohm interface circuit 40 in the Transmit One circuit 28. That voice signal is provided via the normally closed contacts of relay 220 to line 58. Line 58 serves as the input to the 1,100 Hz low-pass filter 42 in the Transmit One circuit 28. Line 100 carries the balanced modulator 80 output signal of the Transmit Two circuit 30, which output signal is provided, via normally closed contacts of relay 220, to line 102. Line 102 serves as the input to the 2,400 Hz low-pass filter 82 of the Transmit Two circuit 30.

The state of closure of the contacts of the relays 220, 222 and 224 is controlled by the energization of a relay coil associated with each relay.

For example, a relay energization coil 864 is associated with relay 222, a relay energization coil 866 is associated with relay 220 and a relay energization coil 868 is associated with relay 224. When energized, the relay coil effectuates the switching of its relay to the state opposite to that shown in FIG. 9. The energization of relay coils 864, 866 and 868 is controlled by relay driver circuit 228.

As can be seen, the relay driver circuit 228 comprises a first resistor 870, having one side connected to the bandwidth control input line 274. The other side of resistor 870 is connected to the common point of one side of a resistor 872, the cathode of a diode 874 and one input of NAND gate 876. The other side of resistor 872 is connected to a plus 15 volt bias terminal and the anode of the diode 874 is connected to ground. The other inputs to the NAND gate are connected to a plus 5 volt bias terminal. Accordingly, the NAND gate operates as an inverter. The output of NAND gate 876 is connected to one side of resistors 878, 880 and 882. The other side of resistor 878 is connected to the base of transistor 884, the other side of resistor 880 is connected to the base of transistor 886, and the other side of resistor 882 is connected to the base of transistor 888. The emitters of transistors 884, 886 and 888 are connected to ground. The collector of transistor 884 is connected to the anode of a diode 890. Diode 890 is connected in shunt with relay energization coil 864. The collector of transistor 886 is connected to the anode of diode 892. Diode 892 is connected in shunt with relay energization coil 868. The collector of transistor 888 is connected to the anode of diode 894. Diode 894 is connected in shunt with relay energization coil 866. The cathodes of diodes 890, 892 and 894 are connected together to one side of capacitors 896 and 898 and to one side of a resistor 900. The other side of resistor 900 is connected to a plus 15 volt bias terminal. The other side of capacitors 896 and 898 are connected to ground.

When a low signal is applied at the bandwidth control input line 274, thereby indicating that the full voice mode of operation is desired, a low signal appears at the cathode of diode 874, whereupon NAND gate 876 provides a high signal, via resistors 878, 880 and 882 to the bases of transistors 884, 886 and 888, respectively. This action results in transistors 884, 886 and 888 conducting, whereupon relay energization coils 864, 866 and 868 are energized via the 15 volt bias connected to resistor 900. Upon being energized, the relays switch to the opposite state from that shown in FIG. 9. Once in the opposite state from that shown in FIG. 9, the Interface and Control Circuit 36 is arranged for full voice mode of operation.

In the full voice mode of operation, the full bandwidth voice portion signal as provided by the Transmit Two Circuit 30 on line 105 is enabled to pass via the now closed contacts of relay 222 to line 254 and from there to resistor 840 in the linear combiner 232. At the same time, the resistors 834, 836 and 838 in the linear combiner are connected to ground via the now closed contacts of relay 222. The dialing information provided by the Transmit Two circuit 30 on line 116 passes directly into resistor 832 in the linear combiner. The dialing signals and the voice signals are combined in the linear combiner and provided on line 258 to the 600 ohm interface circuit 234 from whence they are provided via lines 22B to the MXRB.

Once relay 220 is switched to the opposite state shown in FIG. 9, the line 100 is isolated from line 102 whereas line 56 is connectd to line 102, whereupon the voice signals provided at the input to the Transmit One circuit are routed around the 1,100 Hz low-pass filter in said circuit and instead pass through the 2,400 Hz low-pass filter 82 in the Transmit Two circuit 30.

When relay 224 is in the opposite state from that shown in FIG. 9, line 138 is grounded and isolated from line 186, whereupon the voice, data and dialing signals appearing on line 186 are precluded from entering the Receive One circuit 32 but are enabled to pass into the Receive Two circuit 34. Furthermore, line 190 is isolated from line 188 and line 188 is connected via now closed contacts to line 260. Furtherstill, line 140 is isolated from line 142 and line 142 is connected via now closed contacts to line 262. As a result of these connections, the DC to 2,400 Hz full voice signal provided by the 2,400 Hz low-pass filter of the Receive Two circuit 34 is enabled to pass via line 186 and line 142 to the variable attenuator 120 in the Receive One circuit 32 and from there through the 600 ohm interface to the PBXA.

It is of course to be understood that a similarly arranged Interface and Control Circuit 36 is provided in MXRB and said circuit operates in the same manner as circuit 36 of MXRA.

In FIG. 10 there is shown the details of the DC Signal Routing Circuit 38 for the MXRA. The DC Signal Routing Circuit 38 for the MXRB is of identical construction as the circuit 38 of the MXRA.

As can be seen in FIG. 10, the DC Signal Routing Circuit 38 includes input line 276, which line carries the dialing information from PBXA associated with voice 1, line 278, which carries the dialing information from PBXA associated with voice 2, lines 160, which carry the dialing information from the MXRA associated with voice 1 and lines 214, which carry the dialing information from the MXRA associated with voice 2.

The DC Signal Routing Circuit 28 is connected to output line 64, which serves to carry the dialing information associated with voice 1 to the MXRA and line 108, which serves to carry the dialing information associated with voice 2 to the MXRA. A pair of lines 902 is connected to the DC Signal Routing Circuit 38, and are adapted to be connected together in the DC Signal Routing Circuit during the full voice mode of operation. When connected together, lines 902 can be used to provide "busy" signals to other telephones connected to the associated multiplexer if any of such other phones are removed from their cradles.

As can be seen, the routing circuit 28 comprises four relays namely, 904, 904, 908 and 910.

The state of the relays 904, 906, 908 and 910 as shown in FIG. 10 is indicative of the state of the relays during the duplex mode of operation. In such a state, the relays are said to be de-energized. The energization of relays 904 and 906 is controlled by driver 912 and the energization of relays 908 and 910 is controlled by driver 914.

As can be seen, the bandwidth control input line 274 is connected to an inverter 916. The output of inverter 916 is provided as an input to a two input AND gate 918. The other input to AND gate 918 is provided by OR gate 920. One input of OR gate 920 is connected to the output of AND gate 918 and the other input is connected to an inverter 922. The input to inverter 922 is connected to line 64. The output of AND gate 918 is provided as one input to a two input AND gate 924 and as one input to a two input AND gate 926. The output of AND gates 924 and 926 are provided as inputs to OR gate 928. The output of OR gate 928 is connected to the other input of AND gate 924. The other input of AND gate 926 is connected to line 276, which line is in turn connected to line 64.

The output of AND gate 918 controls the operation of driver 912 and the output of OR gate 928 controls the operation of driver 914.

In the duplex mode of operation, lines 108 and 278 are connected via normally closed pairs of contacts in relays 906 and 910. Accordingly, the M lead associated with voice 2 from PBXA is connected to the voice 2 input M lead of the MXRA. Since line 276 is connected at all times to line 64, the M lead associated with voice 1 from PBXA is connected to the input M lead associated with voice 1 of the MXRA. Furthermore, lines 160 are connected via closed contacts in relay 904 to lines 280 and lines 214 are connected via closed contacts in relays 904 and 908 to lines 282. In such a condition, the E leads associated with voice 1 from the MXRA are connected to the E leads associated with voice 1 of the PBXA and the E leads associated with voice 2 from the MXRA are connected to the E leads associated with voice 2 of th PBXA. 9

Operation of the DC Signal Routing Circuit 38 in switching to the full voice mode of operation is as follows: Assuming that as heretofore previously discussed, phone A1 is in communication with phone B1 and phone A1 and B1 switch to the full voice mode of operation. In such a condition, the bandwidth control input of each routing circuit 38 is provided with a low signal. The low signal is inverted by inverter 916 and provided as a high to AND gate 918. Since the telephone associated with the DC Signal Routing Circuit 38 is off hook, i.e. phone A1 is off hook, a low signal is provided via line 276 to the inverter 922. Accordingly, the output of the inverter 922 is high. This high signal passes through OR gate 920 to the other input to AND gate 918. Accordingly, the output of the AND gate 918 goes high, whereupon driver 912 energizes its associated relay coils (not shown) which causes relays 904 and 906 to switch to the opposite state from that shown in FIG. 10. This action has the effect of connecting lines 902 together via a now closed pair of contacts in relay 906. The connected lines 902 may be used to provide a busy signal to any phone associated with PBXA other than phone A1, if the handset of that other phone should be removed from its cradle.

The high signal appearing at the output of AND gate 914 is provided as one input to AND gate 924 and 926. Since the output of OR gate 928 was low during the immediately preceeding duplex mode of operation, a low signal will be provided into the other input to AND gate 924, the output thereof will be a low signal and will be provided to OR gate 928. Furthermore, the low signal appearing on line 276 provided as the other input to AND gate 926. Accordingly, the output of AND gate 926 is low and is provided to the other input to OR gate 928. Accordingly, the output of OR gate 928 remains low and driver 914 does not energize the associated relay energization coils (not shown) to switch relays 908 and 910 to the opposite position from that shown in FIG. 10.

Upon the phone A1 being replaced in its cradle, i.e. put back on hook, line 276 goes high, whereupon the high signal appearing on the output of line 918 and the high signal appearing on line 276 enables AND gate 926 to provide a high signal at its output. The high signal appearing at the output of gate 926 is provided via OR gate 928 to driver circuit 914 which effectuates the switching of relays 908 and 910 to the opposite position from that shown in FIG. 10. Once driver 914 changes the position of relays 908 and 910, the DC Signal Routing Circuit 38 is arranged to route both voice and dialing information in the full voice mode of operation. To that end, as should be appreciated, the dialing signal provided on lines 214 by the Receive Two circuit 34 of the MXRA are enabled to pass through the now closed contacts of relay 904 to lines 280, which lines are the PBXA input E leads associated with voice 1. Furthermore, line 276, which is the M lead output of PBXA associated with voice 1, is connected via now closed contacts in relays 908 and 906 to line 108, which line is the M lead associated with voice 1 input to the MXRA.

The following are the component values for the resistors capacitors, and inductors in the system. The resistors are measured in ohms at 5 percent, one-fourth watt unless otherwise noted. Resistors marked 1 percent are one-eighth watt. Capacitors are measured in microfarads at 5 percent unless otherwise noted.

| Component | Component Value |
|---|---|
| 282 | 0.01 |
| 284 | 34.8K,1% |
| 288 | 1,000pf,1% |
| 290 | 121K,1% |
| 292 | 121K,1% |
| 294 | 2,000pf,1% |
| 296 | 910pf,1% |
| 298 | 1,000pf,1% |
| 300 | 61.9K |
| 302 | 36pf |
| 306 | 5.11K,1% |
| 308 | 6.40K,1% |
| 310 | 1,000pf,1% |
| 312 | 107K,1% |
| 314 | 2,000pf,1% |
| 316 | 107K,1% |
| 318 | 1,000pf,1% |
| 320 | 510pf,1% |
| 322 | 56pf |
| 326 | 5.11K,1% |
| 328 | 6.98K,1% |
| 330 | 53.6K,1% |
| 332 | 1K |
| 334 | 100 |
| 336 | 68.1K,1% |
| 338 | 1,000pf,1% |
| 340 | 1,000pf,1% |
| 342 | 2,000pf,1% |
| 344 | 68.1K,1% |
| 346 | 1,500pf,1% |
| 348 | 34K,1% |
| 350 | 180pf |
| 354 | 2K,1% |
| 356 | 5.23K,1% |
| 358 | (value as needed) |
| 360 | (value as needed) |
| 362 | 100 |
| 364 | 2.5K |
| 366 | 39K |
| 368 | 0.01 |
| 370 | 10K |
| 374 | 4.7K |
| 376 | 12K |
| 378 | 1K |
| 380 | 8.2K |
| 384 | 2.7K |
| 386 | 3K |
| 388 | 30K |
| 394 | 510 |
| 396 | 5.1K |
| 398 | 0.5 |
| 400 | 215 turns No. 30 wire |
| 404 | 1K |
| 406 | 2.5K |
| 408 | 15 |
| 410 | 15 |
| 412 | 5.1K |
| 416 | 3.3K |
| 418 | 1K |
| 420 | 3.3K |
| 424 | 5.62K,1% |
| 428 | 5.62K,1% |
| 432 | 6.8K |
| 442 | 4.3K |
| 444 | 10K |
| 446 | 510K |
| 448 | 15pf |
| 454 | 5.62K,1% |
| 456 | 5.62K,1% |
| 458 | 4.3K |
| 460 | 27.4K,1% |
| 464 | 0.01 |
| 466 | 15.4K,1% |
| 468 | 1,000pf,1% |
| 470 | 59K,1% |
| 472 | 1,000pf,1% |
| 474 | 29.4K,1% |
| 476 | 2,000pf,1% |
| 478 | 59K,1% |
| 480 | 1,100pf,1% |
| 482 | 36pf |
| 486 | 4.99K,1% |

-Continued

| Component | Component Value |
|---|---|
| 488 | 5.76K,1% |
| 500 | 27.4K,1% |
| 502 | 2,000pf,1% |
| 504 | 2,000pf,1% |
| 506 | 13.7K,1% |
| 508 | 2,000pf,1% |
| 510 | 2,000pf,1% |
| 512 | 27.4K,1% |
| 514 | 910pf,1% |
| 516 | 75pf |
| 520 | 10K,1% |
| 522 | 12K,1% |
| 524 | 1K,1% |
| 526 | 100 |
| 528 | 22.9K,1% |
| 530 | 2,000pf,1% |
| 532 | 11.5K,1% |
| 534 | 2,000pf,1% |
| 536 | 2,000pf,1% |
| 538 | 2,000pf,1% |
| 540 | 22.9K,1% |
| 542 | 1,000pf,1% |
| 544 | 220pf |
| 548 | 5.76K,1% |
| 550 | 8.66K,1% |
| 552 | 13.7K,1% |
| 554 | 2,000pf,1% |
| 556 | 2,000pf,1% |
| 558 | 6.81K,1% |
| 560 | 2,000pf,1% |
| 562 | 2,000pf,1% |
| 564 | 13.7K,1% |
| 566 | 3,900pf,1% |
| 568 | 820pf |
| 572 | 499,1% |
| 574 | 1.65K,1% |
| 576 | (value as needed) |
| 578 | (value as needed) |
| 580 | 510 |
| 582 | 5.1K |
| 584 | 0.25 |
| 586 | 150 turns No. 28 wire |
| 590 | 1K |
| 592 | 2.5K |
| 594 | 500 |
| 598 | 1K |
| 600 | 10K |
| 602 | 604,1% |
| 608 | 7.5K |
| 610 | 0.5 |
| 612 | 215 turns No. 30 wire |
| 616 | 1K |
| 618 | 1K |
| 620 | 0.1 |
| 624 | 9.1K |
| 626 | 5K |
| 628 | 0.068 |
| 630 | 0.5 |
| 632 | 1.5 |
| 634 | 51K |
| 636 | 5.1K |
| 640 | 220K |
| 642 | 1.5 |
| 646 | 200K |
| 648 | 1.5 |
| 662 | 100 |
| 664 | 0.01 |
| 670 | 100 |
| 672 | 0.01 |
| 680 | 82K |
| 682 | 0.5 |
| 686 | 51K |
| 688 | 0.25 |
| 698 | 100 |
| 700 | 0.01 |
| 708 | 0.01 |
| 710 | 1K |
| 712 | 3.9K |
| 716 | 0.01 |
| 718 | 0.5 |
| 720 | 75K |
| 722 | 1.5K |
| 726 | 960 |
| 734 | 100 |
| 736 | 2.5K |
| 740 | 1K |
| 742 | 10K |
| 746 | 10K |
| 748 | 0.25 |
| 750 | 150 turns No. 28 wire |
| 752 | 1K |

-Continued

| Component | Component Value |
|---|---|
| 756 | 1K |
| 758 | 500 |
| 760 | 60.4K,1% |
| 762 | 60.4K,1% |
| 764 | 1,000pf,1% |
| 768 | 2,000pf,1% |
| 770 | 22 |
| 772 | 1,000pf,1% |
| 774 | 30.1K,1% |
| 776 | 1K |
| 778 | 1K |
| 780 | 0.1 |
| 784 | 9.1K |
| 786 | 5K |
| 788 | 0.033 |
| 790 | 0.5 |
| 792 | 1.5 |
| 796 | 51K |
| 798 | 5.1K |
| 804 | 470 |
| 806 | 0.01 |
| 810 | 470 |
| 822 | 30K |
| 824 | 250 turns No. 30 wire |
| 826 | 1.5 |
| 832 | 10K,1% |
| 834 | 10K,1% |
| 836 | 10K,1% |
| 838 | 10K,1% |
| 840 | 10K,1% |
| 842 | 20K,1% |
| 848 | 604,1% |
| 854 | 805,1% |
| 856 | 2.5K |
| 858 | 1K |
| 862 | 20K |
| 870 | 2K,2W (Watt) |
| 872 | 4.3K |
| 878 | 560,½W |
| 880 | 560,½W |
| 882 | 560,½W |
| 896 | 15 |
| 898 | 15 |
| 900 | 10,2W |

Without further elaboration, the foregoing will so fully illustrate my invention, that others may, by applying current or future knowledge, readily adapt the same for use under various conditions of service.

What is claimed as the invention is:

1. In a system for use with a common grade telephone voice channel comprising first means operative for transmitting a first voice signal, second means operative for transmitting a second voice signal, third means for transmitting a first "on hook" signal when said first means is not operating and for transmitting a first "off hook" signal and first dialing signals when said first means is operating, fourth means for transmitting a second on hook signal when said second means is not operating and for transmitting a second off hook signal and second dialing signals when said second means is operating, the improvement comprising: first receiving means comprising first discriminating means for discriminating between said first off hook signal and other signals which may exist within said channel, second discriminating means for discriminating between valid dialing signals and other signals which may exist within said channel and first gate means operative in response to the detection of a valid off hook signal by said first discriminating means for enabling said first dialing signals to signal a particular telephone in accordance with the content of said dialing signals and second receiving means comprising third discriminating means for discriminating between said second off hook signal and other signals which may exist within said channel, fourth discriminating means for discriminating between valid second dialing signals and other signals which may exist within said channel and second gate means operative in response to the detection of a valid off hook signal by said third discriminating means for enabling said second dialing signals to signal a particular telephone in accordance with the content of said dialing signals.

2. The improvement as specified in claim 1 wherein said first discriminating means monitors if said first off hook signal has persisted for a predetermined period of time sufficient to ensure that said off hook signal is a valid off hook signal and wherein said third discriminating means monitors if said second off hook signal has persisted for a predetermined period of time sufficient to ensure that said off hook signal is a valid off hook signal, said first discriminating means enabling said first gate if said first off hook signal is a valid off hook signal and said third discriminating means enabling said second gate if said second off hook signal is a valid off hook signal.

3. The improvement as specified in claim 1 wherein said second discriminating meand determines if each of said first dialing pulses are of at least a predetermined duration to ensure that each is valid and wherein said fourth discriminating means determines if each of said second dialing signal is of at least a predetermined duration to ensure that each is valid.

4. The improvement as specified in claim 3 wherein said second discriminating means precludes signals of less than said predetermined duration from being provided to said first gate and wherein said fourth discriminating means precludes signals of less than said predetermined duration from being provided to said second gate.

5. The improvement as specified in claim 4 wherein said first receiving means also comprises a first normalizing means to normalize the signal from said second discriminating means and wherein said second receiving means also comprises a second normalizing means to normalize the signal from said fourth discriminating means.

6. The improvement as specified in claim 5 wherein said first receiving means also comprises a first tone detector which is operative to provide a first logic signal in response to said first on hook signal, a second logic signal in response to said first off hook signal and first logic signals in response to said first dialing signals and wherein said second receiving means also comprises a second tone detector which is operative to provide a first logic signal in response to said second off hook signal, a second logic signal in response to said second off hook signal, and first logic signals in response to said second dialing signals.

7. The improvement as specified in claim 6 wherein said first discriminating means comprises first memory means for controlling said first gate and a first pulse forming circuit for providing a pulse to said memory means to result in the enabling of said first gate if said second logic signal exists for a predetermined period of time and wherein said third discriminating means comprises second memory means for controlling said second gate and a second pulse forming circuit for providing a pulse to said second memory means to result in the enabling of said second gate if said second logic signal exists for a predetermined period of time.

8. The improvement as specified in claim 7 wherein said first discriminating means also comprises a third pulse forming circuit for providing a pulse to said first memory means to result in the disabling of said gate if said first logic signal exists for a predetermined period of time and wherein said third discriminating means also comprises a fourth pulse forming circuit for providing a pulse to said second memory means to result in the disabling of said second gate if said first logic signal exists for a predetermined period of time.

9. The improvement as specified in claim 8 wherein said second discriminating means comprises first logic means for switching logic states to that of an input signal when actuated by a pulse at an actuating input thereof and a fifth pulse forming circuit forming a pulse a predetermined period of time after said first tone detector changes logic states, the input to said first logic means being coupled to said tone detector and the actuating input of said first logic means being coupled to said fifth pulse forming circuit and wherein said fourth discriminating means comprises second logic means for switching logic states to that of an input signal when actuated by a pulse at an actuating input thereof and a sixth pulse forming circuit for forming a pulse a predetermined period of time after said second tone detector changes logic states, the input to said second logic means being coupled to said second tone detector and the actuating input to said second logic means being coupled to said sixth pulse forming circuit.

10. The improvement as specified in claim 9 wherein said first and said second normalizing means each comprise a monostable multivibrator.

* * * * *